United States Patent
Hensley et al.

(10) Patent No.: US 12,511,105 B2
(45) Date of Patent: Dec. 30, 2025

(54) TRANSPILER TO EXTRACT AND USE INTERMEDIATE REPRESENTATIONS OF A CODE BASE

(71) Applicant: Driver AI, Inc., Austin, TX (US)

(72) Inventors: Daniel Westbrook Hensley, Austin, TX (US); Adam Kevin Tilton, Austin, TX (US)

(73) Assignee: Driver AI, Inc., Austin, TX (US)

( * ) Notice: Subject to any disclaimer, the term of this patent is extended or adjusted under 35 U.S.C. 154(b) by 0 days.

(21) Appl. No.: 19/044,565

(22) Filed: Feb. 3, 2025

(65) Prior Publication Data

US 2025/0251917 A1    Aug. 7, 2025

Related U.S. Application Data

(60) Provisional application No. 63/549,385, filed on Feb. 2, 2024.

(51) Int. Cl.
| | |
|---|---|
| G06F 8/40 | (2018.01) |
| G06F 8/41 | (2018.01) |
| G06F 8/73 | (2018.01) |
| G06F 16/31 | (2019.01) |
| G06F 16/334 | (2025.01) |
| G06F 40/40 | (2020.01) |

(52) U.S. Cl.
CPC ............... *G06F 8/427* (2013.01); *G06F 8/73* (2013.01); *G06F 16/31* (2019.01); *G06F 16/334* (2019.01); *G06F 40/40* (2020.01)

(58) Field of Classification Search
CPC .................................. G06F 8/427; G06F 40/40
USPC ........................................................ 717/147
See application file for complete search history.

(56) References Cited

U.S. PATENT DOCUMENTS

| | | | |
|---|---|---|---|
| 5,175,856 A | 12/1992 | Van Dyke | |
| 5,619,709 A | 4/1997 | Caid | |
| 7,153,065 B2 | 12/2006 | Behrens | |
| 10,628,584 B1 * | 4/2020 | Norton | ................. G06F 21/563 |
| 10,761,839 B1 | 9/2020 | Migoya | |
| 11,734,517 B1 | 8/2023 | Abi-Akl | |

(Continued)

FOREIGN PATENT DOCUMENTS

| | | |
|---|---|---|
| CN | 108491407 B | 1/2021 |
| CN | 112966095 A | 6/2021 |
| CN | 117008960 A | 11/2023 |

OTHER PUBLICATIONS

Non-final Office Action for U.S. Appl. No. 19/044,569 dated Apr. 21, 2025, pp. 1-37.

(Continued)

*Primary Examiner* — Hanh Thi-Minh Bui
(74) *Attorney, Agent, or Firm* — Pillsbury Winthrop Shaw Pittman LLP

(57) ABSTRACT

Provided is a process including: obtaining, with a computer system, access to a code base; decomposing, with the computer system, the code base into parts; classifying, with the computer system, the parts according to content type; selecting, with the computer system, processing templates based on the content types, with at least some different content types having different selected processing templates; and generating natural language documentation for the parts, with one or more generative language models, using the processing templates selected for the parts.

21 Claims, 6 Drawing Sheets

(56) References Cited

U.S. PATENT DOCUMENTS

| | | | |
|---|---|---|---|
| 2002/0059348 A1 | 5/2002 | Lee | |
| 2004/0220944 A1 | 11/2004 | Behrens | |
| 2014/0282403 A1 | 9/2014 | Frenkiel | |
| 2018/0067836 A1* | 3/2018 | Apkon | G06F 8/34 |
| 2018/0136914 A1 | 5/2018 | Payette | |
| 2020/0097261 A1 | 3/2020 | Smith et al. | |
| 2021/0240725 A1 | 8/2021 | Shortt | |
| 2021/0357210 A1* | 11/2021 | Clement | G06N 3/084 |
| 2022/0206759 A1 | 6/2022 | Samuel | |
| 2022/0261241 A1* | 8/2022 | Balasubramanian | G06N 3/04 |
| 2022/0358158 A1 | 11/2022 | Hsiao | |
| 2023/0351115 A1* | 11/2023 | Zeng | G06F 40/30 |
| 2024/0134639 A1 | 4/2024 | Rosenbaum | |
| 2024/0160441 A1 | 5/2024 | Rosenbaum et al. | |
| 2024/0281487 A1* | 8/2024 | Bathwal | G06F 16/9558 |
| 2024/0346248 A1 | 10/2024 | Rappo | |

OTHER PUBLICATIONS

International Search Report & Written Opinion for Application No. PCT/US2025/014373 dated May 26, 2025, pp. 1-11.

International Search Report & Written Opinion for Application No. PCT/US2025/014372 dated Jun. 2, 2025, pp. 1-11.

Shubhang Shekhar Dvivedi et al., 'A Comparative Analysis of Large Language Models for Code Documentation Generation', International Conference on Software Engineering, arXiv:2312.10349v1, Dec. 2023 [retrieved on Apr. 29, 2025], pp. 1-9.

Daya Guo et al., 'GraphCodeBERT: Pre-Training Code Representations with Data Flow', arXiv preprint, arXiv:2009.08366v1, Sep. 17, 2020 [retrieved on Apr. 29, 2025], pp. 1-18.

The Wayback Machine, Autodoc-Toolkit for auto-generating codebase documentation using LLMs, Mar. 2023, pp. 1-6. https://github.com/context-labs/autodoc/blob/master/README.md.

Parth Sarthiar et al., arXiv, RAPTOR: Recursive Abstractive Processing for Tree-Organized Retrieval, Jan. 31, 2024, pp. 1-52. https://arxiv.org/html/2401.18059v1.

The Wayback Machine, lettria, Turn Unstructured Text into a Graph, Dec. 2023, pp. 1-8. https://www.lettria.com/features/text-to-graph.

Devansh, Medium, An overview of how to Do Retrieval Augmented Generation, RAG Part 1—Understanding the best practices and ideas for LLM-enabled RAG systems, Aug. 9, 2024, pp. 1-33. https://machine-learning-made-simple.medium.com/an-overview-of-how-to-do-retrieval-augmented-generation-3075292c0bed.

* cited by examiner

TRANSPILER TO EXTRACT AND USE INTERMEDIATE REPRESENTATIONS OF A CODE BASE

CROSS-REFERENCE TO RELATED APPLICATIONS

The present application claims the benefit of U.S. provisional patent application 63/549,385, filed Feb. 2, 2024, titled TRANSPILER TO EXTRACT AND USE INTERMEDIATE REPRESENTATIONS OF A CODE BASE. The entire content of each of the afore-listed patent filing is hereby incorporated by reference for all purposes.

BACKGROUND

1. Field

The present disclosure relates generally to artificial intelligence and, more specifically, to transpilers to extract and use intermediate representations of a code base.

2. Description of the Related Art

In a variety of situations, it can be useful to generate natural language text about another document or corpus of documents. In some cases, that corpus or document may be in a structured language, like portions or all of a code base, or in some cases, that document may be unstructured natural language text, such as novels, research papers, litigation discovery productions or responses, screen plays, transcripts, plays, email repositories, and the like. The generated text about that source material may take a variety of forms, including explanations, summaries, expositions, timelines, technical documentation, and many other examples described in the application that follows.

SUMMARY

The following is a non-exhaustive listing of some aspects of the present techniques. These and other aspects are described in the following disclosure.

Some aspects include a process including: obtaining, with a computer system, access to a code base; decomposing, with the computer system, the code base into parts; classifying, with the computer system, the parts according to content type; selecting, with the computer system, processing templates based on the content types, with at least some different content types having different selected processing templates; and generating natural language documentation for the parts, with one or more generative language models, using the processing templates selected for the parts.

Some aspects include a process including: obtaining, with a computer system, access to a code base; decomposing, with the computer system, the code base into parts; generating, with the computer system, documentation for the parts with a language model; associating, with the computer system, the documentation with the parts; indexing, with the computer system, the documentation; obtaining, with the computer system, a query searching for content in the code base; searching, with the computer system, using the index, the code base based on the generated documentation to identify documentation corresponding to the query and, then, content in the code base associated with the identified documentation; and responding, with the computer system, to the query, by identifying the content in the code base associated with the identified documentation.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
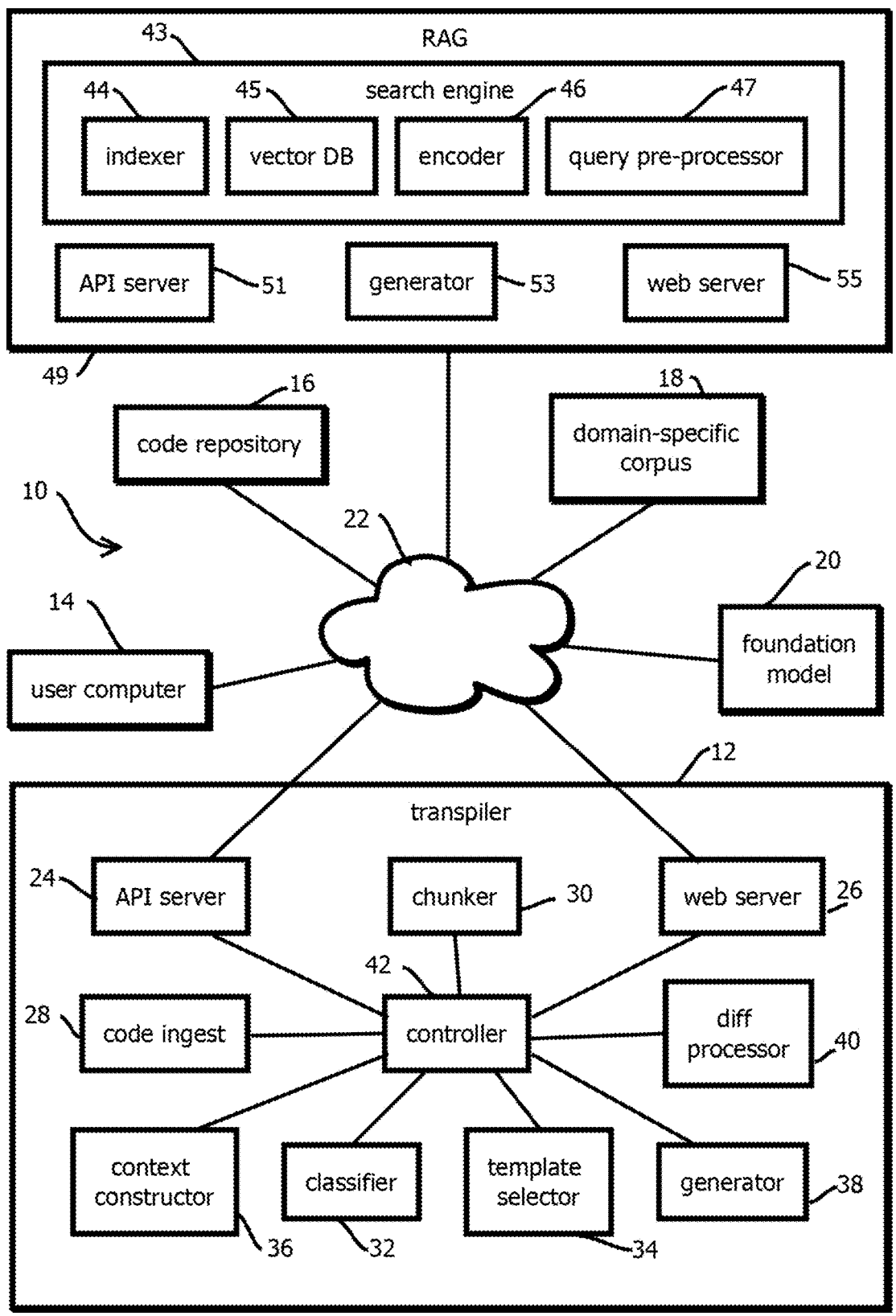
FIG. 1 illustrates an example of a computing system with a transpiler and a retrieval augmented generation system in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer science, natural-language processing, and artificial intelligence. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In modern software development, code bases can be quite large. Often, teams of hundreds or even thousands of developers can collaborate over years or longer to build and maintain code bases. These code bases can span more than a million lines, for example, more than five million or more than ten million lines of source code and other content. In some cases, these code bases can be quite diverse in terms of the type of content they contain as well, for example, including code in different programming languages, different states of compilation or interpretation, third-party libraries and frameworks, internal libraries and frameworks, interaction and dependencies on specific hardware, and various other assets like image files, audio files, fonts, and application data. The code base may contain the source code and other related data for an application that is to be executed on other computing devices, and this code base may be or be stored on a system of record in which that code base is built and maintained. In some cases, a code base may be a single program or a collection of programs that cooperate to implement an application. That application may be a monolithic application run on a single machine or a distributed application executed on several different computing devices, for instance.

Creating documentation for code bases is challenging. Often there are diverse audiences with diverse purposes and skill levels that need to be informed about how to use, integrate, maintain, install, uninstall, configure, and otherwise interact with a code base. As a result, many different forms and styles of documentation are often needed, targeting various use cases, audiences, and abstraction levels. Documentation can be as expansive as the code base itself in some situations. While the authors of the source code are in best position to explain and document their code, they may not be incentivized to do so, writing documentation is a different skill than writing code, and language fluency can all cause challenges in generating quality documentation in any capacity. Often enough, it does not exist. A second major issue with documentation is keeping it up-to-date as the underlying code evolves. Even if documentation is written thoroughly and well once, much less likely, is this maintained over time. It has been said that stale documentation, or incorrect documentation, is worse than no documentation at all. Generally, the documentation is in a human readable natural language format, e.g., unstructured natural language text, for instance, in text files, markdown, principal document formats, and the like. Examples of documentation for a code base include technical documentation, architecture descriptions, getting started guides, user guides, product briefs, application landscape summaries, block diagrams, audio summaries, video summaries, tutorials, application notes, code base summaries, dependency graphs, compliance documentation, security analysis reports, memory safety reports, performance analysis reports, testing documentation, public-facing API descriptions, internal documentation, system architecture diagrams, executive summaries, user persona definitions, user stories, and user journeys.

Many generative large language models (LLMs) are not well suited for reliably generating content about a large corpus, like a code base, where that generated content is consistently structured in a way that is tailored for different types of content in the corpus, across the corpus as a whole, particularly when that generated content is both granular and generated in view of the overall corpus. Many LLMs often struggle to, or simply cannot, fit the entire code base in their context window, and even if they could, their output size is typically limited far too severely to afford documentation of sufficient length (e.g., more than 10,000 tokens, more than 100,000 tokens, or more than 1,000,000 tokens) and granularity. Moreover, even if such LLM's output constraints were relaxed, these models generally would not consistently adhere to desired structures for output (e.g., addressing each of several specified topics, like in an outline) that are tailored to different granular units of the code base or other content (e.g., addressing different topics for different content types).

A particular challenge is that, while consistent structures in output are often desired in such documentation, in many cases the desired output structure may vary depending upon the content type at issue. Many LLMs are not well suited to appropriately select among and apply a variety of different output formats when generating their outputs to structure outputs in the appropriate way or even suitably address every topic in the structure.

Such challenges are even more acute when generating documents that serve purposes beyond merely summarizing, which can be an explicitly lossy and compressive operation (which is not to suggest that summarizing or any other form of characterizing parts of a corpus, or any other approaches, are disclaimed). Technical documentation will sometimes isolate specific concepts of a codebase and exhaustively describe them or describe code elements at various levels of detail, from one-to-one with the level of code to high level summaries. Using LLMs to target content at arbitrary levels of detail, abstraction, and focus is needed to satisfy general needs of technical documentation (which is not to suggest that embodiments are limited to systems that attain all of these objectives or that any other described feature is required in all embodiments).

Some embodiments mitigate these and other issues by breaking down the overall project of generating documentation into pieces, where different language-model prompts (and other forms of processing described below) are selected for those pieces to keep the language model's individual tasks narrow in scope and focused on a discrete result that is used as a small part of the overall project of generating documentation. Some embodiments decompose and separate decisions about kind from decisions about producing content for each kind instead of trying to have LLMs do both in one call. Some embodiments decompose with deterministic software operations (or a mix of deterministic and non-deterministic operations) first, leaving tasks which cannot be broken down further procedurally to be performed by the LLM. Here, "non-deterministic" may include dedicated calls to an LLM model. To this end, some embodiments systematically decompose a corpus, such as a code base, into a directed acyclic graph (DAG) in which nodes represent parts of the corpus, or compilations of parts. For example, the DAG may encode a hierarchy in which nodes higher in the hierarchy correspond to compilations of parts in nodes lower in the hierarchy. In the context of a code base, some embodiments may form this DAG to model, and in some cases mirror, some or all of a directory structure and arrangement of files in a code base, with DAG nodes corresponding to directories and leaf nodes corresponding to individual files or empty directories.

Some embodiments may further decompose those files, e.g., in a way that depends upon their type, into more granular parts, of which the files are a compilation. Some embodiments may use the tags applied to the file to select a parser (e.g., a static analysis parser or an LLM parsing system) or other tool for further decomposing the file, e.g., selecting a Python™ parser for a Python™ file, a Java™ parser for a Java™ file, and an XML parser for an XML file. For instance, some embodiments may create a graph (e.g., another graph, but one corresponding to one of the leaf nodes of the DAG) like an abstract syntax tree (AST) or parse tree that, in accordance with the grammar of a structured language, parses valid syntactic symbols of the language and their relationships and stores this information in a tree. This AST or parse tree is distinct from the DAG. In some embodiments the AST or parse tree so constructed corresponds to one leaf node of the DAG and is a further and distinct decomposition of the codebase into valid syntactic symbols corresponding to the language of the file. In some embodiments, a codebase-wide AST or parse tree is constructed wherein the sub-tree for each file is connected to sub-trees in other files (nodes of the DAG) in correspondence with the reference and import mechanism of the language at hand. In some embodiments, a symbol table or partial AST or partial parse tree may be constructed instead. A symbol table here meaning a data structure containing some or all of the valid syntactic symbols found in the file and which may or may not contain any information about relationships between symbols. Similarly, partial ASTs, partial parse trees, or symbol tables so defined may also be constructed globally for the codebase. In some embodiments, a codebase containing many languages may lead to the construction of multiple ASTs, parse trees, or symbol tables. In some cases, where such a parser is not available, some embodiments may instruct a language model to generate these parts. Examples of resulting parts might include things like functions, classes, and objects identified by a parser, dictionaries and lists identified by a data format parser, e.g., for JSON, YAML, XML, hunks in diff or patch files, headers and sections in markdown and other markup languages, or other examples below. In systems that generate documentation for unstructured data, like a novel or screen play, such parts might be elements of a story, like characters, a protagonist, a problem, a chapter, or storyline, or the like. Some embodiments decompose a part of a codebase into (part) of an abstract syntax tree (AST) or symbol table that represents all or part of the code at a particular level of abstraction. In some cases, embodiments use of a full AST allows some embodiments to bring into context code from outside a given file, as appropriate for documenting a particular symbol in that file that is referenced or used elsewhere.

Some embodiments may classify the resulting parts, in some cases, as part of the above-described parsing operations, and tag them with one or more tags indicating the content type of the parts. In the context of nodes in the DAG, such tagging might include things like labeling the respective nodes based on tags applied to lower-level nodes in the DAG, e.g., as indicating whether they contain content relevant to some topic. Types of tags may include things like source code, not source code, configuration data, content relevant to testing, content relevant to user interfaces, content relative to a frontend or backend, content relevant to a main program or exit of a program, content critical to the core architecture, content relevant to build and installation, content relevant to a legacy modernization, content relevant to hardware-software interfaces, content containing important external or public facing interfaces, content containing API endpoint descriptions or definitions, and the like. In some cases, tags may also indicate types of programming language or data structures contained within the directory or file corresponding to the node in the DAG. In some cases, a given node may have a plurality of different tags, for instance, in a predefined ontology or taxonomy.

In some cases, the above-described parts created by parsing structured languages in files may also be tagged through classification. In some cases, files may be tagged and parsers selected based on extensions in file names. For example, tagging a file as Python™ source code and selecting a Python™ parser in response to determining that the file name ends in .py or .pyc. In some cases, each node or node satisfying various criteria of an abstract syntax tree produced by a parser or symbol table produced by a parser may each be designated a part for subsequent processing. And those parts may be classified according to the classification attributed to them by the parser. For example, the parser may both identify symbols of functions and variables within a file and designate those symbols as such based on the grammar and syntax of the file. Thus, in some cases, parsing and classification may be part of the same operation. Some embodiments may further label parts with additional tags with other tools, like a type checker that checks types based on the output of the parser, to label some parts by the resulting type designations.

In some cases, to provide the desired consistency, specificity, and tailoring of output structures to content types, some embodiments may then select processing templates for parts, to generate documentation based on the tags applied to the parts, both at the level within files and at the DAG level, described above. In some cases, the processing templates may consistently specify a set of prompts, a set of analysis tools, or logic by which prompts are selected among and applied to collectively produce a specified output structure based on the tags applied. This logic may include both serial steps where the input of one depends on the output of the preceding as well as parallel steps that have no dependencies and can be executed in parallel. Terminal steps of the logic may include aggregation of various intermediate or parallel-generated outputs into a single structured output. One processing template may call another. A highest-level processing template may cause calls to many lower-level processing templates used based on predetermined or run-time-determined classifications at more local levels. A particular processing template may further include decomposition steps as well as other types of processing.

For example, such output formats of documentation may specify that, in a technical document of a particular type, for each symbol in a part tagged as a function, within a file tagged as source code, a model is to be prompted to analyze and produce output describing input to the function. A separate prompt may instruct the model to analyze the function and provide output describing logic and control flow of the function. A third prompt may instruct a language model to analyze the function and describe output of the function. In some cases, differently fine-tuned models may be specified as well for each prompt. This highly-structured, granular, and focused task and content in the context window is expected to produce a desired format reliably. Some embodiments may enforce output structure explicitly and reliably by separating concrete tasks as described such that we can programmatically assemble or combine them into larger and consistently structured pieces of documentation. Additionally, some embodiments further enforce rigid structure, as needed in each individual language model call by providing the language model with a schema to adhere to as part of the prompt. For example, for the input-describing task, some embodiments enforce a rule that this information be provided as a particular kind of list. Similar approaches may be applied, for example, in object-oriented programming languages to symbols like those designating classes, or to hierarchical data serialization formats, like JSON, to symbols designating lists or dictionaries. In some cases, various prompts within a processing template may also specify output describing purposes of something like a function or class, imports thereto, and dependencies therefrom, in some cases, with each purpose having a corresponding prompt to the language model that is distinct from the others. In some cases, these processing templates may specify multiple passes, for instance, a first pass like that described above, and then with a second pass in which functions that call a given function being documented, or functions called by the given function, are analyzed by the language model with instructions to modify the result of the first pass if those analyses indicate that that first pass is inaccurate or it could be otherwise enriched or improved. In some cases, documentation for a part may be formed by populating an outline, like one specified by the processing template, with results of these granular prompts to language models. Some embodiments iteratively update documentation by traversing the DAG in reverse topological order. This may typically cause information to flow from high level content in the top-level folder descriptions toward low-level details in leaf node files. When some embodiments create content at the level of a file or folder (or even lower, such as a symbol of a file), some embodiments associate it with the corresponding DAG node to maintain rich hierarchical information alongside the explicit content.

In some cases, the documentation of the parts may then be used to create documentation of compilations of the parts, for example, corresponding to entire files or nodes of the DAG corresponding to directories containing collections of files. In some cases, documentation for the parts may be aggregated or otherwise built up by a LLM or other language model. In some cases, this process may be repeated, working up the DAG, until documentation associated with the top-level node of the DAG is created, in some cases with the benefit of documentation associated with each of the lower nodes in the graph. As a result, the top-level documentation may be created with a view to the entire code base or other corpus. Some embodiments may then perform a second pass where this overall view is then applied from the bottom up again as added context, for instance, with instructions to modify the documentation at that level if that added context indicates it could be improved.

As a result, in some embodiments, processing like that described above may produce granular, reliably-structured, consistent output that is appropriately tailored to the type of content at issue and is created with an understanding over the overall code base or other corpus, even across a very large code bases or other corpora. This is expected to produce, in some cases, documentation that is larger and more detailed than that that can typically be produced by any one prompt to LLMs, with consistency that can typically not be obtained with even a sequence of untailored prompts to those LLMs. For even modestly sized codebases, such as less than 50,000 lines of code, the number of individual LLM calls made with this approach may number in the tens of thousands or more and will generally scale with the size and complexity of a codebase. The automatic scaling of the method with codebase size, shape, and complexity enables consistency and reliability for documentation of any codebase. In some cases, these outputs may be assembled in a consistent structure and presented to users or stored in memory in association with the portions of the code base or other corpus that they describe. For example, users often expect technical documentation to map directly to the files of a codebase and be navigable in that manner. Processing and associating output with the nodes of the DAG facilitate this kind of documentation. For instance, such documentation may be used for subsequent presentation with the documentation in one window on a user's screen and the corresponding portion of the code base in another adjacent window on the user's screen.

The inventors have further recognized that documentation like that described above, whether generated with that process or otherwise, could be used to improve search against a corpus, like a code base. In particular, such search could be used to improve retrieval augmented generation, in which additional natural language content or other structured or unstructured content is generated based upon search results to produce content about those search results. Generating the documentation in advance, before using it in search, is expected to produce relatively low-latency, high-quality search results for use cases like retrieval augmented generation, e.g., suitable for real-time user interfaces, like text box, such as chatbot user interfaces, in which a user submits, prompts, and expects a time to first token of less than two minutes, like less than 30 seconds or less than 500 milliseconds, and completed outputs within similar time scales. Furthermore, some content created in the technical documentation transpilation steps may be optimized specifically to be available as pre-computed knowledge for low-latency RAG agents to take advantage of for common user queries, or queries that are difficult or generally not possible to answer well with LLMs in a low-latency RAG type of context. For example, building an architecture description of an entire 1-million-line codebase or collectively listing all API endpoints implemented throughout the 1-million-line codebase represent tasks many users may ask for but that are hard for a RAG agent to construct an answer to in short order. This is in part because these questions require exhaustively checking of the codebase to answer with consistency and high quality. The transpiler, in some embodiments, can do so and provide pre-computed content so that a RAG agent can quickly consult this derived content and answer the query with high quality and low latency.

Some approaches to retrieval augmented generation select chunks based on vector search of those individual chunks in raw form. This can, in some cases, lead to unreliable search results relative to what is expected to be achieved by searching against documentation about those chunks or the combination of the raw form and documentation of the raw form, particularly if that documentation is generated in a consistent, appropriately tailored format with a view of the overall code base or other corpus. Some embodiments may pre-compute documentation like that described above, decorate the underlying parts with it through associating, and search against it with vector search at query time to identify the corresponding parts of the code base or other corpus to use when generating content responsive to a prompt. In some cases, the prompt for retrieval augmented generation may be used as the query, or in some cases, a given prompt may first be pre-processed to identify one or more queries to compute an appropriate response. Or some embodiments may be used for search for other purposes, like navigating a code base or other corpus.

While the present techniques are described with reference to a code base, it should be emphasized that the present approaches may be applied in other domains, e.g., to document regulations, case law, contracts, social media content, reasoning in chain of thought prompt outputs from reasoning models, historical records, screenplays, deposition or court transcripts, patents, document productions in a litigation, books, magazines, newspapers, email, and the like. In some cases, the present techniques may be applied to data in the form of markup languages like HTML, XML, configuration languages such as JSON, YAML, complex generic data formats such as printable document format (PDF), and the like.

To expand on concepts discussed above, it is noted the concept of using an LLM to generate documentation for a code base has been proposed, but naively inputting a code base into contemporary large language models, even those that are state-of-the-art, does not yield good results. One challenge is that documentation should be drafted with an understanding of the code base as a whole, and even state-of-the-art models, e.g., with million token plus context windows, struggle when even a moderately sized code base is input. In some cases, good documentation should answer both needle-in-the-haystack questions (locally relevant and detailed) and what the haystack looks like as a whole (holistic and conceptual). Naively dropping a code base into the model's context window generally does not achieve good results or reliable documentation. In many cases, it is not possible to provide the entire content of a codebase into the input context window of a model or to maintain important hierarchical information when doing so. In many cases, it is not possible for the expected output to fit within the output limits of a model. Even when these limits do not apply, it is difficult to enforce consistent regardless of size-across orders-of-magnitude variations in codebase size—with naïve methods. Generating documentation that is exhaustive, consistent, low-level when it needs to be, high-level in other parts of the documentation, and in a manner that can be applied across orders-of-magnitude in codebase size and shape, in some cases, benefits from a systematic, structured, and typically iterative solution, as the inventors have realized can be informed by information theoretic first principles.

Some embodiments mitigate these and other issues by decomposing a code base into parts, generating documentation for the parts, and then generating further documentation based on subsets (such as aggregations) of the previously generated documentation, for instance, summarizing summaries or grouping descriptions of a certain kind together at a larger scale (e.g., documentation for all API endpoints in a submodule). Some embodiments may repeat this process of generating documentation based on other documentation iteratively increasing the level of abstraction and amount of the code base characterized in each level, generally with the output of a given iteration being more concise than the inputs. Some embodiments may further generate instrumental documentation that primarily serves to guide subsequent iterations at higher levels of abstraction and lower granularity. This process may be repeated until a holistic view of the code base as a whole is reflected in an iteration that accounts for the entire code base or substantial portions thereof. Some embodiments may then repeat the entire process using the documentation created at the top level, characterizing the code base as a whole to inform generated documentation in a repeat pass, again iterating from lower levels of abstraction to higher levels of abstraction or exhaustiveness, potentially revising the characterization of the code base as a whole with better characterizations of lower levels in their documentation. In some cases, this process may be repeated through multiple passes until consecutive passes semantically converge. This process is expected to be highly flexible and afford documentation generation that can be tailored to the type of documentation desired, the level of expertise of the user or other audience for the documentation, the language and locality in which the documentation is to be used, the version of the code base to which the documentation applies and other variations.

In some cases, even with an approach like the above-described divide and conquer strategy, results are suboptimal. For example, a one-size-fits-all prompt for all types of inputs and levels of the hierarchy does not appear to prepare a language model to produce the most suitable output for documentation, which is not to suggest that this approach, or anything else, is disclaimed or disavowed. Some embodiments may further specialize content creation based on categorization and constraints. From a fundamental information theoretic perspective, constraints can provide a helpful opportunity for directing higher quality output. Some embodiments improve document generation by tailoring the processing of inputs to the type of content being processed. For example, if the input is or pertains to source code in the code base, one type of processing template may be applied, while if the input pertains to a configuration file in the code base, a different type of processing template may be used. Similar variations may be applied for metadata, internal libraries, external libraries, internal frameworks, external frameworks, and the like, all of which may appear in a given code base. In some cases, different processing templates may specify, for example, different prompts to the language model, different language models, image generation models, different types of analysis tools like static analysis tools, and different forms of retrieval augmented generation based on external domain-specific corpora. With this more tailored approach, it has been observed that substantially more useful, clear, accurate, and better documentation for code bases can be generated. None of the proceeding is intended to suggest that any approach is disavowed or disclaimed, or that any of these approaches described must be included in all embodiments, which is not to suggest that any other feature described herein is limiting.

In some embodiments, the transpiler like that described above may be used to improve code search and navigation. Code search can be quite useful in a variety of contexts. For example, developers with only expertise in a subset of a code base may use code search to find code in other parts of the code base to understand interactions between the code they maintain and other code. Further code search may be a quick way to navigate within a large code base to specified portions. Code search is also useful in retrieval augmented generation use cases in which segments of a code base or chunks are retrieved to be included in a context window of a generative model, like a code completion model or elements of the presently described transpiler.

Searching a code base can be challenging. As noted, the scale of code bases can be quite expansive, extending into the millions, tens of millions, or even hundreds of millions of lines or more, across deep directory structures and hundreds or thousands of files in diverse formats and languages. Regardless of size, some codebases are not intuitive to navigate or difficult to navigate without prior knowledge of it. Further, keyword search, standing alone, often does not work well for searching code bases. Often the code bases implement a bespoke namespace in which things are named in a manner that is unique to that code base and do not necessarily translate into natural language that might be used to describe a user's intent in a query. Often queries are expressed functionally, for example, a request to search for portions of a code base in which the code can exit, enter, access a database, interrogate an API, respond to an API request, access or modify a global variable, call a type of function, implements recursion, or the like. In some cases, semantic search methods, such as those that use embedding models to map content to an embedding domain wherein distance in the domain correlates with closeness of semantic meaning, are used in this context.

Some embodiments may mitigate these and other challenges by decorating the content of a code base with intermediate representations (like documentation) based on that content. Some embodiments may search against those intermediate representations as a way to index into portions of the code base responsive to queries. Of note, those intermediate representations may describe the corresponding functions and features of the code base in functional language like that used to express some queries, rather than being as tightly coupled to the namespace of the code base. This is expected to improve retrieval augmented generation, source code navigation, and query processing in general by search engines for code bases. In some cases, the searches may span multiple code bases as well.

It should be emphasized that these different ideas may be used together or independently, which is not to suggest that any other set of features is required in all embodiments. Further, as noted above, embodiments are not limited to implementations that provide the present described benefits or that do not suffer from the present described issues with other approaches as various inventive techniques are described that may be used together or independently.

Some embodiments implement a LLM (or other architecture-based) transpiler, which in some cases, can both connect the world's existing source code (e.g., in structured languages) with human-language descriptions, queries, and directives (e.g., in natural languages) and turn a software development process from a one-way process (natural language conceptualization to structured language source code) to a two-way process (natural language conceptualization to structured language source code and back, at user-specified levels of abstraction and complexity). Some embodiments build a rich understanding—e.g., a comprehension—of a code base or set of code bases methodically and using this comprehension to build high-quality, user-facing content that explains software assets across abstraction levels and degrees of complexity. Some embodiments convert the unidirectional process of business needs→product features-→software implementations into a bidirectional one, so that business can understand existing software assets, plan, and make decisions. The term "transpiler" as used herein includes models that can convert structured language code (e.g., source code, byte code, assembly, machine code, binary, etc.) into natural-language expressions characterizing that structured language code.

Some embodiments implement an LLM transpiler toolchain that allows users to bridge the gap between human language (and business/product/non-technical as much as technical) understanding of software assets and the source code of those assets. This is a more complex and challenging version of workflows involving software compiler and transpiler toolchains that convert from higher-level languages to other high-level languages (transpiler) or to machine code (compiler). A part of this process, in some embodiments, is the production of intermediate representations (IRs) of the structured language code, such as an "LLM AST (abstract syntax tree)," which may be used to generate the natural language output.

As noted above, many LLMs are not well suited to analyze and "transpile" typical code bases, which can be relatively large, often containing more than 200,000 tokens, and in many cases more than one or ten million tokens, all of which are larger than the context window of LLMs. Further, even when a code base can fit within a context window of an LLM, traditional attention mechanisms often fail to appropriately attend to and capture structure in the input source code, such as sub-function/method, function/method, sub-program, and program hierarchies (and other forms of modularity) expressed in source code. Naïve application of vector search to inform retrieval-augmented generation faces similar issues, as source code may be chunked in ways that fail to capture this structure in source code. Chunks used in vector-search-based RAG may span functions, or segment functions, for example. As a result, such LLMs often hallucinate more than is desirable, do not produce output with consistent structure that users would expect, can produce unreliable results more broadly, and fail to address user needs. Further, the computational complexity of mitigating these issues through larger context windows can scale quadratically with window size, often consuming more computing resources than are available in many systems. Some embodiments mitigate these issues with the described techniques, though it should be emphasized that systems that suffer from these issues are not disclaimed and embodiments may address other issues as well.

Some embodiments may include one or more of the following aspects:

a. Comprehend: Systematically breaking apart a resource, such as a code base, and comprehending it through descriptions and distillations of distinct information. This produces a milieu of intermediate representations (IRs) at various levels of abstraction.

b. Explain: Converting comprehension into explicit natural-language explanations and artifacts consumed by users, such as structured documentation, product briefs, application landscape summaries, and block diagrams, audio summaries, video summaries, tutorials, application notes, and the like.

c. Build: Using comprehension and explanation content to power a platform that can enable users to understand their assets, make decisions, and direct energies in building new systems or updating existing systems.

Some embodiments include the following features:

a. Approaches for digesting arbitrarily large code bases with arbitrary complexity, language kind, and application domain.

b. Comprehending the logic contained in the code base and expressing/distilling across multiple intermediate representations, abstraction levels, and signal types.

c. Empowering LLM agent systems to generate advanced IR development and complex user-facing documentation by equipping them with semantically searchable vector stores of the generated IRs and RAG (retrieval-augmented generation) strategies.

d. Explaining to a user critical elements of the comprehension in the form of structured documentation, technical descriptions, product and user descriptions, and summary descriptions.

e. Building high-value information at abstraction levels of an entire code base or collection of code bases, including non-technical content tailored with different voices to different groups inside of an organization.

f. Using comprehensions to build additive features, update code, and suggest next steps.

g. Combining sophisticated comprehension and intermediate representations with LLM agent systems to explain and build with code bases and entire application landscapes.

h. Design and decision-making platform combined with universal code and human language explanations transpiler.

Some embodiments include an LLM agent, which may have an LLM instance along with supporting software and processing templates to generate content.

Some embodiments may transform source code into IRs, which may be a data structure formed from the source code, before (and used to respond to) prompting to produce output natural-language content. Some embodiments methodically generate a rich set of descriptions of arbitrarily large code bases or sets of code bases referred to as intermediate representations. They may be produced hierarchically, across the abstraction level stack (from individual symbols of code, to whole files, to whole code bases, to collections of code bases). Some embodiments use these IRs in RAG-based strategies to create very sophisticated user-facing content based on generated and vectorized rich IR content.

Some embodiments may be implemented in the computing environment 10, illustrated by FIG. 1. Some embodiments may include a transpiler 12 configured to generate documentation at the direction of a user computer 14 for source code and other assets in a code repository 16, in some cases communicating via a network 22 such as the internet and various local networks. In some cases, the generated code may be generated with the benefit of information in a domain specific corpus 18, and the documentation may be natural language documentation generated with a foundation model 20, such as a language model like a large language model.

The user computer 14 may be a desktop computer, laptop computer, tablet computer, wearable computer, mobile computing device, or the like. This computer and the other components described herein may be implemented with one or more of the computing devices described below with reference to FIG. 6. In some cases, one or more of such devices may for a computing system. In some cases, there may be a large number of user computers interacting concurrently with the transpiler 12 via the network 22, for instance, under different, securely isolated tenant accounts with different roles and permissions, and users being authenticated by presenting credentials to the transpiler 12 and code repository 16, for example, some embodiments may interact with more than 100; more than 1,000; or more than 10,000 user computers distributed geographically over the United States or the world via the network 22. In some cases, each of the illustrated components in the computing environment 10 may be geographically diverse from one another and replicated in multiple instances.

In some embodiments, the code repository 16 stores a plurality of code bases for a plurality of different users (or tenants). As noted above, the code bases may be quite large and there may be a large collection of users each authorized to interact with the respective code base. In some cases, the code repository 16 may be a version control system, such as GitHub™, Mercurial™, Subversion™, Team Foundation™, or the like, configured to maintain versions, branch versions, merge versions, and otherwise facilitate the development and maintenance of a code base. In some cases, the code repository is a local code repository, like in a local directory on the computing device 14.

The code bases may include human readable source code in one or more programming languages, compiled code in machine code, interpreted code in byte code, and unstructured assets like audio and images, in some cases in combination. The code bases may also include metadata, like comments on commits or pull requests, readme files, and prior versions of documentation. The code bases may also include configuration files, which in some cases may contain data that configures source code upon being parsed, examples including JSON (JavaScript Object Notation) files, YAML (YAML Ain't Markup Language) files, XML (Extensible Markup Language) files, and other hierarchical, structured serialized data formats. The code repository may also include, within a code base, internal libraries, external libraries, internal frameworks, and external frameworks.

In some cases, a code base may be organized in a directory structure, like a hierarchical directory structure with three or more levels of directories and various files in each of the directories, encoding the above-described types of information in the code base. In some cases, this directory structure and file collection by which the code base is organized may serve as a basis for decomposing the code base into parts. In some cases, individual files may be further decomposed into parts, for instance, based upon a threshold number of tokens, branches in an abstract syntax tree formed by a parser, or delimited by functions or other software modules.

Some embodiments may further be configured to access a domain-specific corpus 18. Examples include marketing material about software, reviews of software, documentation of libraries, application program interfaces, frameworks, or other applications with which the software interacts, documentation specifying standards for software documentation, regulatory requirements for software documentation, or the like.

Some embodiments may further be configured to interact with one or more foundation models 20. In some cases, the foundation model is a trained large language model having more than 1 billion parameters, such as more than 7 billion, more than 70 billion, or more than 400 billion parameters. In some cases, the language model may be a transformer architecture or a state space model. In some cases, the language model may implement a mixture of experts architecture in which different sub models specialize on various topics. In some cases, the language model may implement multi-headed attention to attend to prior tokens in a sequence of text. Some embodiments may be configured to interface with the plurality of different types of foundation models or other models, for instance, models that have been fine-tuned to various different purposes in text generation or image generation. Some embodiments may be configured to interface with a diffusion model configured to generate images to be paired with text generated by a large language model or other language model. Some embodiments may be configured to interface with fine-tuned language models, such as those fine-tuned to a specific technical context (e.g., programming language), language style (e.g. standard technical English or the style guide of a particular company), or application space/market vertical (e.g., embedded code, web application code, etc.).

In some embodiments, a key-value (KV) cache may be maintained in association with a large language model (LLM) to store previously computed key and value tensors associated with attention mechanisms in a transformer-based architecture. The key-value cache may store key and value tensors corresponding to prior token sequences within an ongoing inference session, allowing subsequent tokens to reference precomputed attention values rather than recomputing them for each forward pass. This may reduce computational overhead and expedite inference, particularly in autoregressive decoding scenarios. The KV cache may be implemented as a contiguous memory buffer or as a structured data store that maps past tokens to corresponding key and value embeddings, which may be retrieved efficiently using positional indices.

In some embodiments, cache management techniques may be implemented to optimize memory usage and computational efficiency. Cache warming may involve precomputing and storing key-value tensors for frequently encountered token sequences or preloading expected prompts to reduce initial latency. This may be performed during model initialization, session setup, or as a background process during idle computation cycles. When cache warming is employed, stored key-value pairs may be retrieved immediately upon processing a new token, reducing redundant computations for common sequences.

In some embodiments, cache eviction policies may be implemented to manage memory constraints. When the allocated cache memory reaches capacity, older or less relevant entries may be discarded based on criteria such as least recently used (LRU) eviction, least frequently used (LFU) eviction, or a time-based expiration strategy. Additionally, hierarchical cache structures may be employed, where high-priority sequences are retained in a faster-access memory tier while lower-priority sequences are moved to a secondary storage tier.

In some embodiments, memory layout optimizations may be applied to facilitate efficient cache access. The KV cache may be structured as a ring buffer, where newer key-value pairs overwrite the oldest ones when memory limits are reached, reducing fragmentation and improving memory locality. Data alignment techniques may be used to improve access patterns for modern hardware architectures, such as vectorized operations or tensor-core-accelerated retrieval.

In some embodiments, distributed caching strategies may be employed when running LLM inference across multiple devices or nodes. Key-value pairs may be sharded across multiple memory locations, with lookup operations coordinated using a distributed index. This may allow scalable inference across large-scale deployments while maintaining low-latency access to cached computations. Cache coherence protocols may be implemented to synchronize updates across distributed memory locations to ensure consistency when cache entries are modified or invalidated.

In some embodiments, adaptive cache resizing strategies may be used to dynamically allocate memory to the KV cache based on workload demand. When inference load is high, additional memory resources may be provisioned to expand the cache capacity, whereas during periods of lower demand, memory may be deallocated to conserve resources. Dynamic cache tuning may involve monitoring access patterns and adjusting cache parameters, such as key-value tensor compression, downsampling, or quantization, to optimize storage efficiency without significantly degrading retrieval accuracy.

In some embodiments, speculative caching techniques may be employed, where key-value tensors are precomputed for potential next tokens based on probabilistic token prediction. This may involve branching computations based on multiple likely continuations of a sequence, allowing immediate retrieval if a predicted token is selected. This may improve inference throughput by reducing the need for redundant attention computations in the event of high-confidence predictions.

In some embodiments, cache invalidation mechanisms may be implemented to remove stale or invalidated entries. When modifications to an LLM occur, such as fine-tuning updates or model checkpoint changes, existing KV cache entries may be deemed outdated. Cache invalidation policies may trigger recomputation of key-value tensors in affected areas while preserving unaffected portions of the cache to minimize redundant computations.

In some embodiments, hybrid caching approaches may be used, combining in-memory caching with persistent storage to retain KV cache entries across inference sessions. This may allow caching of frequently used sequences beyond the scope of a single session, reducing redundant computation across multiple users or repeated queries. Persistent KV caches may be indexed using hash-based lookup tables or database-backed storage layers, facilitating efficient retrieval of key-value tensors even after model restarts.

Some embodiments may apply a reasoning model to generate documentation. The reasoning model may employ reinforcement learning to enhance reasoning capabilities in large language models without relying on supervised fine-tuning. The model may undergo a multi-stage training process, beginning with reinforcement learning on a base model, where it gradually self-evolves to exhibit complex reasoning behaviors. This process may include optimizing a policy using group relative policy optimization, applying rule-based rewards to assess accuracy and format consistency, and iteratively refining responses through structured templates.

To improve readability, a second-stage training process may incorporate cold-start data, such as curated long-chain-of-thought reasoning examples, e.g., examples reasoning how to generate documentation or in verifiable domains. This data may be used to fine-tune the model before applying reinforcement learning again. Additional refinement may occur through rejection sampling and supervised fine-tuning, where responses are filtered for correctness and coherence. A final reinforcement learning stage may further align the model with human preferences, incorporating both reasoning and general-purpose data. In some cases, a larger model's reasoning capabilities are also distilled into smaller dense models through fine-tuning, affording efficient deployment on lower-capacity architectures.

Group Relative Policy Optimization (GRPO) may be used to train the reasoning model to improve reasoning capabilities efficiently while reducing computational costs. Unlike some policy optimization methods that require a separate critic model, GRPO estimates the training baseline from grouped scores, reducing resource overhead. During training, for each input query, GRPO samples multiple candidate outputs from the current policy. These outputs may be evaluated using a reward function, which in some cases, includes accuracy-based and format-based rewards. The model's objective may be to maximize the probability of higher-reward outputs while penalizing deviations from prior behavior using a Kullback-Leibler (KL) divergence term to maintain training stability. In some embodiments, the optimization process follows a clipped policy gradient update, ensuring that updates are within a bounded range to prevent overly aggressive changes. By leveraging group-based relative comparisons instead of absolute value-based critiques, GRPO is expected to afford more stable and efficient reinforcement learning, facilitating the emergence of complex reasoning behaviors.

Some embodiments may implement various attention mechanisms in language models to balance computational efficiency and contextual understanding. Flash Attention may partition queries, keys, and values into tiles that fit within high-bandwidth memory, reducing redundant memory access by performing matrix multiplications and softmax normalization in a streamed manner. This may improve efficiency on hardware accelerators such as graphics processing units (GPUs).

Sliding Window Attention may be used to limit self-attention to a fixed-size window around each token, maintaining a rolling set of relevant keys and values while discarding distant tokens. Some embodiments may adjust window sizes dynamically or incorporate dilated attention to capture longer-range dependencies with lower computational cost. This approach may support long-sequence modeling while conserving memory.

Multi-Head Latent Attention may be used. This approach may first project input tokens into a reduced set of latent vectors, performing self-attention in the latent space before refining representations by attending back to original tokens. Multiple latent heads may extract diverse features, and routing mechanisms may select the most relevant latent vectors. This may reduce pairwise interactions while preserving contextual meaning.

In some embodiments, the transpiler 12 may execute the processes described below with reference to FIGS. 2 and 4 to operate on data structures like those described below with reference to FIG. 3. In some cases, the transpiler 12 may be hosted in a data center behind load balancing, session management, orchestration, and other forms of tooling that allow the transpiler 12 to concurrently serve a relatively large number of concurrent sessions. Or in some embodiments, each of the components of the computing environment 10 or any subset thereof may be executed locally, for example, on the user computer 14. In some cases, in a monolithic application.

In some embodiments, the transpiler 12 may include an application program interface (API) server 24 and a web server 26. In some cases, they may be non-blocking servers configured to serve API requests or web requests respectively, for instance, from the user computer. In some cases, the user computer 14 may interact with the transpiler 12 via a web browser or via a special purpose native application.

Some embodiments may include a code ingest module 28 configured to ingest code from the code repository 16 at the direction of the user computer 14. In some cases, obtaining a code base may entail obtaining the entire code base at once by downloading the entire code base from the code repository 16 (or accessing it locally) or obtaining subsets thereof with the entire code base not being held in memory at any given point in time. In some cases, the code ingest module 28 may be operative to interrogate an API of the code repository 16 to retrieve a copy of the code base. Which in some cases may be received in encrypted and compressed form, for instance as a zip file or a tarball. Some embodiments may decrypt and decompress the obtained code base which in some cases may be obtained with its directory structure intact. In some cases, the code may be ingested by recursively traversing the directory structure, for instance, with a depth first or breadth first traversal of the directory structure, retrieving and processing each file or directory. In some cases, each of the steps implemented in FIG. 1 may be performed concurrently, for instance, on different parts of a code base or different code bases, for example, on different instances of each of the described modules operating concurrently.

In some cases, the obtained code base may be decomposed into parts with the chunker 30. Some embodiments may apply two levels of chunking for decomposition, with different chunking strategies at the different levels.

One level of decomposition may involve constructing a hierarchical DAG based on the file tree of a code base. This DAG may serve as a foundation for systematic traversal, topological ordering, and structuring exhaustive processing passes. Each IR, regardless of complexity, in some embodiments, may be associated with a corresponding node in the DAG in a one-to-many relationship. This association may maintain hierarchical context within the codebase and may facilitate semantic search, structured traversal, and dependency-aware analysis in some embodiments.

Another level of decomposition may involve generating abstract syntax trees (ASTs) and symbol tables, extending beyond the structural representation of the file tree DAG. This process may entail parsing source code to extract language-specific symbols, constructing symbol table data structures, and generating ASTs that capture syntactic and semantic relationships. This, in some embodiments, allows for comprehensive documentation of granular code components, capturing symbol relationships such as function calls, type dependencies, and inter-file linkages that are not discernible from the file tree DAG alone.

Some embodiments of the chunker 30 may leverage the DAG for larger-scale traversal and then utilizing AST and symbol table analysis within each DAG node, corresponding to an individual file, to extract and generate low-level content representations with greater semantic depth.

Decomposing the code base into parts may include decomposing it into more than five, more than 500, or more than 5,000 parts, each accounting for, e.g., less than 20%, 2%, or 0.2% of the code base by token count. In some cases, the parts may be approximately equal size or different size. In some cases, the boundaries of the parts may be defined in part or in whole by the directory structure of the code base, with each file being a different part. In some cases, the code base may be decomposed further, for instance, by breaking individual files into parts, e.g., by parsing files with a parser to form an abstract syntax tree and splitting code corresponding to different branches thereof or groups of constituent symbols. In some cases, decomposing the code base into parts may entail filtering the code base to eliminate some parts from subsequent processing or not putting some parts into parts for subsequent processing. In some cases, source code files may be decomposed into parts at the boundaries of functions or loops or methods or objects. In some cases, configuration files may be decomposed into parts by selecting a level of a hierarchy of organization of key value pairs and decomposing at that level.

In some embodiments, the classifier module 32 may be configured to classify a type of content in each of the parts, delimited by the chunker 30. Examples of types of content include source code, metadata, configuration files, internal libraries, internal frameworks, external libraries, external frameworks, and the like. Or other ontologies may be used, which is not to suggest that other described features may not also vary. In some cases, classification may be based on static analysis of metrics such as size in lines of code or bytes. In some cases, classification may be based on other methods of static analysis such as analyzing file extensions in file names. Some embodiments may implement regular expressions to detect things like JSON, XML, YAML, or the like. In some cases, the classification may be performed by the foundation model 20 (which may be a plurality of differently specialized foundation models). In some cases, the classes into which the content is placed may be predefined in an ontology having more than two, more than three, more than four, or more than five different classes of content types.

Some embodiments may classify the following content types:
  a. Kind of codebase (global): embedded software application, web application, firmware, embedded library, IoT application, microservices component, monolithic repository, fintech application, ERP application, data science, or numerical computing.

b. Audience (global): software developer, hardware developer, product team, executive leadership, management, security teams, etc.
c. Concept relevance tags for a node (file or folder): relevant to architecture, relevant for testing, relevant for configuration and initialization, relevant for build system instruction, relevant for hardware-software interfaces, relevant for planning legacy modernization, relevant for externally facing interfaces, relevant for API endpoints. These labels may be binary (relevant vs. not relevant) or more granular (such as highly relevant vs. somewhat relevant vs. irrelevant, e.g., with a score from 1 to 10).
d. Size and complexity of a node (such as a file): size (small, medium large), SLOC (source lines of code), bytes, symbol count, number of modules, etc.
e. Size and complexity of a node (folder): number of children or aggregated complexity based on complexity metrics or categories of children.
f. Conceptual kind of character stream (file): metadata files, configuration files, data transfer language, markup language, or programming language source code file.
g. Formal kind of character stream (file): programming language for source code files or specific non-programming language for data transfer language, markup languages, etc., as elucidated by extension or inspection.
h. Symbol parsing tool to be used (e.g., when operating internal to file): set of parsing tools, e.g., tree-sitter grammar implementation for C, Rust, or C++ and subset of symbols of interest to be acted on based on the identified formal kind of file (for instance, struct, union, enum, function, global variable, etc. for C). (Based on the language and symbol set classification, some embodiments may also configure whether a call graph can be built or should be built and used to enrich symbol content generation by bringing in context from callers/callees.)
i. Fallback defaults: when using classification schemes, it is often useful to have a fallback variant that can be identified by the algorithm (software, LLM, or both) or set by default in the event of errors.
j. Constrained output schema (which may be used with RAG agents as well as transpiler processing): classify on should embodiments use constrained output with a particular schema or leave content generation structure unconstrained. Throughout content generation, and especially for final user-facing output types, some embodiments may classify whether they should use explicitly (such as predetermined predetermined) output schema and take action based on this. Some embodiments do not always constrain output with structure, which is not to suggest that any other feature is limiting.

Some embodiments may include a template selector 34 configured to select a processing template based on the content type for a given part of the code base determined by the classifier 32. In some cases, each content type may have its own processing template or in some cases a given content type may have a plurality of different processing templates selected among with further logic implemented by the template selector 34. Examples include selections based on a level of a hierarchy of intermediate representations, selections based on whether the content is called by other code in the code base or is dormant or otherwise vestigial content, or selections based on functionality, selections based on syntactic form such as kind of symbol for a particular programming language (e.g., function/method, data structure/class, global variable, macro, etc.) for instance whether the part contains an exit from processing, initiates processing, calls other functions, implements recursions, implements polymorphism, or the like.

In some cases, processing templates may specify a prompt to the foundation model to be paired with the text of the part to which it is applied. Examples of prompts include things like "summarize this source code," with various guides on styling and summarization goals. Other examples include requests to extract information like "list all of the global or local variables," identify any API calls, summarize the function of each method or the like. In some cases, these prompts may be expressed in natural language human readable text. In some cases, prompts may specify formats for outputs, goals, style guides, length constraints, and the like.

In some cases, the processing templates may specify static analysis tool to be applied to the part of the code base at issue. In some cases, the output of these static analysis tools may be supplied to the foundation model 20 along with a corresponding prompt specified in the processing template. Output of the static analysis tool may be provided as context with the prompt to the language model.

Some embodiments may involve performing static analysis on source code to identify potential issues, enforce coding standards, or optimize performance. Static analysis may involve parsing the source code to construct an abstract syntax tree (AST), which represents the syntactic structure of the code. The AST may then be traversed to extract semantic information, such as variable declarations, control flow structures, and function calls. In some embodiments, static analysis tools may be used to construct a symbol table by parsing, identifying, and collecting specific symbols germane to the coding context at hand. In some embodiments, a control flow graph (CFG) may be generated to represent possible execution paths within the program. The CFG may be constructed by analyzing branching statements, loops, and function calls to determine how execution may flow from one statement to another. Some embodiments may also generate a data flow graph (DFG), which may track the flow of data between variables and functions to detect issues such as uninitialized variables, dead code, or potential security vulnerabilities.

Some embodiments may employ rule-based pattern matching to detect violations of predefined coding guidelines. Such rules may be expressed as syntactic patterns that match specific code structures or as semantic rules that enforce constraints on variable usage, function signatures, or type conversions. Rule evaluation may be performed by traversing the AST or by executing queries on an intermediate representation of the code. Some embodiments may include customizable rule sets that allow developers to define their own analysis criteria.

Some embodiments may incorporate symbolic execution, in which program execution is simulated using symbolic values rather than concrete inputs. Symbolic execution may involve maintaining a symbolic state that tracks constraints on variables as execution branches through different paths. Constraint solvers may be used to determine whether specific execution paths are feasible, allowing detection of potential runtime errors such as division by zero, buffer overflows, or null pointer dereferences. Some embodiments may combine symbolic execution with fuzzing techniques to generate test cases that explore paths likely to trigger errors.

Some embodiments may employ type inference mechanisms to detect type mismatches or ensure adherence to type constraints. Type inference may involve propagating type information through expressions and function calls by analyzing how variables are assigned and used. Some embodiments may integrate with compiler frontends to leverage existing type checking capabilities or perform additional checks beyond those enforced by the programming language.

Some embodiments may generate reports summarizing detected issues, including source code locations, explanations of potential problems, and suggested remediations. Reports may be formatted in a structured manner, such as JSON or XML, to facilitate integration with other development tools. These outputs may be used by a language model to generate documentation, or the outputs may be used to select additional prompts to language models.

Some embodiments may apply machine learning techniques to improve the accuracy of static analysis. Machine learning models may be trained on annotated codebases to predict the likelihood of a code pattern being problematic. Some embodiments may use embeddings to represent code features and apply classification or clustering techniques to identify patterns indicative of defects or security vulnerabilities. In some cases, matching may detect known instances of open source code, which may be associated with a copy of the corresponding license, and the terms of that license may be summarized in documentation or compliance checklists may be generated for the license.

Some embodiments may optimize performance by employing incremental analysis, where only modified portions of the source code are reanalyzed after changes are made. Incremental analysis may involve caching intermediate representations and selectively updating affected portions of the AST, CFG, or DFG. Some embodiments may parallelize analysis tasks by distributing computations across multiple threads or nodes in a distributed system.

The processing templates, and corresponding classifications that indicate use of the same, may lead to different processing of folders and files; source code files and non-source code files; source code files for different programming languages; to produce high level content in secondary passes after the initial core IRs and technical documents have been produced, and based on the kind of codebase detected (e.g., to build an architecture document; or to produce terminal symbol documentation for a particular kind of symbol for a particular kind of programming language. As another example, the smart outline approach described herein may be implemented with a specific kind of processing template oriented around defining an outline with sections, then building prompts for an LLM for each section, then executing those prompts with some sort of RAG agent using an LLM.

A processing template may include a set of one or more steps that includes a specialized LLM call. They may include a predetermined series of steps, such as a predetermined set of parallel (or concurrent) steps. Some embodiments of a processing template include dynamically determined steps. In some cases of processing templates, LLM calls are terminal whereas steps prior to LLM calls may disambiguate, build context, and provide the information to dispatch to an extremely constrained individual LLM calls. LLM-based copy editor and aggregation steps may conclude processing templates. As a result, in some cases, LLM calls may have some or all of the following properties: highly constrained, specific, and localized tasks; with little or no overt decision-making (which may be taken care of by separated processing step). Such templates may instruct an LLM do exactly this with this context and may include examples related to the specialized task. For example: A 5,000 line of code codebase may include 100,000+ or even 1,000,000+ or more individual LLM calls to generate the full set of IRs, such as documentation, for that codebase. This may result, in some embodiments, from highly systematic and exhaustively applied template processing application.

Examples of how processing templates may be specialized for classes include the following:

a. Where the kind of codebase is global, processing templates, in some embodiments may specify: system prompts used in some or all subsequent processing steps, sets and complexity of prompts used in subsequent steps, and sets and complexity of processing templates dispatched to under more local classifications. These templates, in some embodiments, may affect high-level and top-level content generation flows (such as secondary passes and dedicated high-level content generation passes), including what classifications to attempt to make and use for the nodes of the codebase and which high-level or top-level content generation flows will be triggered. For example, some embodiments would not trigger a HW-SW interfaces document creation for a detected web application, and some embodiments would not trigger a REST API endpoints document creation for a detected firmware library.

b. Where the kind of audience is global processing templates, in some embodiments may determine the set and final form of higher level content to be created, and trigger changes to copy editor LLM passes applied to some or all of subsequent final outputs at all levels of abstraction.

c. Concept relevance tags for a node (file or folder) may map onto processing templates that implement the following: Concept relevant tags may be used for passes (e.g., secondary after core IRs are generated) that generate high level content automatically, such as a global Architecture Document, Getting Started Guide, or HW-SW Interfaces. These tags may be used to filter what is considered or not considered for each of these specialized passes as well as how prompts are configured for nodes that are included in various high level content generation passes. For example, the classification may include "highly relevant," "somewhat relevant," and "not relevant" for the concept of testing. When building a complete testing description document automatically for a codebase, some embodiments may not consider 90% of the files labeled "not relevant," dispatch to one kind of processing template (with specialized prompts and potentially parsing) for "highly relevant," and another kind of processing template for "somewhat relevant."

d. Size and complexity of a file node classifications may result in use of processing templates that implement the following: Users may want documentation to map to the importance and size of content. LLMs often do not do this well by default. Classifying particularly small or simple files and then applying strongly constraining processing templates (e.g., specifying prompts and parsing steps) to ensure small files are documented as expected may be helpful. Similarly, by detecting very large files or files that contain absurd amounts of one-line global variables, some embodiments may use processing templates that affirmatively ensure these are handled gracefully (such as reducing the amount of parsing and content generation or switching to summarization over explicit symbol documentation).

e. Size and complexity of a folder node classifications may result in use of processing templates that implement processing similar to the preceding case of files.
f. Conceptual kind of character stream may cause various kinds of specialized processing templates to be used. In some embodiments, processing templates may be present and dispatched to for programming language source code, processing templates may be dispatched for markup languages and data exchange formats, and more different templates may be dispatched to for raw text file formats.
g. Formal kind of character stream for a file classification may trigger use of processing templates that are highly specific to the language and symbols of that language. Specialization steps may include parsing an AST or symbol table, then selecting a subset of symbols to explicitly document and extracting them from the table or AST, iterating through the symbols, preparing one or more specialized prompts for each symbol—which may include static prompt components for all symbols of that type as well as the raw code of the symbol at hand and, in some cases, other snippets such as the broader file context they are found, callers/callees, etc.—making all of the LLM calls, aggregating the results of multiple LLM calls to finish documentation of each symbol, aggregating all symbol documentation into a final total symbol documentation output, then finally producing prose to describe the file as a whole via one or more LLM calls that look at the raw source code of the whole file and, in some cases, a look at all of the symbol documentation produced.
h. Symbol parsing tool to be used (e.g., internal to file) classifications may trigger use of processing templates like the following: In the case of non-LLM parsing, some embodiments may dispatch to the relevant language parser tool. Some embodiments may have a unified interface where those embodiments can use each language's symbol parsing tool to parse symbols then push them to a unified internal representation of symbols, ASTs, and symbol tables. This may be deterministic software, and embodiments may predefine which symbols are to be analyzed on a per-language basis, and how they should be parsed (e.g., specifying an amount of nuance for each language, such as when carrying forward relationship information to other symbols, like methods associated with a class, etc.). Some embodiments push some or all of this to a unified data structure to be used generically to unpack as part of the construction of LLM prompts. LLM parsing may be used as a fallback where a generic conceptual language is used in a first set of prompts that task the LLM with identifying symbols in broad categories, such as "data structures," "functions and methods," "global variables," and "imports." The returned list of symbols are, in some embodiments, then parsed and second set of LLM calls may be made where the LLM is given the file contents and asked to document each named/described symbol from the first pass at a time. These may then be aggregated as described elsewhere herein.
i. Constrained output schema classifications may be used with RAG agents as well as transpiler processing to implement the following in corresponding processing templates: The following examples may use enforced output schema in some cases: content describing specific symbols parsed for a programming language, prose descriptions of an entire file (like some technical documents), prose description of an entire folder (like some technical documents), sections included in automatically transpiler produced high level documents (Getting Started Guide, Architecture Document, HW-SW Interfaces Document, etc.), user-specified content block kinds (e.g., if a user expressly indicates they want a list, table, diagram, or code block output, some embodiments may apply schema to ensure the output follows what was asked), in the smart outline document production paradigm described elsewhere herein the entire processing template may create section and subsection headers then content for each that is guaranteed to keep the primary outline headers and subheaders. Examples of where some embodiments, in some cases, do not to enforce output schema include the following: open-ended responses in the interactive part of the product (where users can ask for anything), in some cases high level document contents are largely left open-ended and not with explicit predetermined structure. Explicit structure may be limited in some cases to top level or key concepts and substructure may be left open-ended. In some of the most granular cases, some embodiments may define strict output schemas to constrain LLMs to generate context to adhere to these specific schemas to improve content generation quality and rigorously enforce consistency. Some language models and their interfaces may provide "strict modes," such as being able to provide a particular schema (e.g., as JSON) at query time, and the LLM may be guaranteed to provide content in accordance with the schema. For example, an embodiment may define a function symbol for a particular language that is documented as follows, using a mix of JSON and pseudocode typing: {"inputs": <list [string]>, "outputs": string, "logic and control flow": <list [string]>}, where prompts can further guide the LLM on what it should put in each component of the schema. The schema for a struct data structure in C and the schema for a function implementation may be very different, but symbol kinds may be relatively conserved across languages for consistency in the user experience.

Some embodiments may include a context constructor, module 36, which may construct the context for a call to the foundation model 20 specified by a selected processing template. This may include selecting, for example, the output of a static analysis tool to be paired with a prompt or interrogating the domain specific corpus 18 for retrieval augmented generation. For example, with that corpus specifying standards for documentation, goals for documentation, style guides for documentation for a given user, or the like. In some embodiments, previously generated documentation intermediate representations may be searched with semantic search or a broader RAG pipeline to provide additional context to build a prompt for model call. In some embodiments, an AST, symbol table, CFG (control flow graph), or DFG (data flow graph) may be used to pull in additional context to build a prompt for a model call. In some cases, the context constructor 36 may append each of these components to the part to form a sequence of tokens supplied to the foundation model 20 in subsequent steps.

In some embodiments, the generator 38 may be configured to supply the context from the context constructor 36 with the prompt from a processing template selected by the template selector 34 to the foundation model 20 to obtain generated text. As used herein, the phrase "generating" in this context does not require operating the foundation model oneself. It is enough to send a request for text generation and receive the response to constitute "generating", even if one does not operate the foundation model themselves.

Some embodiments may include a diff processor module 40, operative to operate on revisions to a code base to update an existing set of documentation, for instance, documentation previously generated by the transpiler 12. In some embodiments, the diff processor 40 may perform the process described below with reference to FIG. 4. Some embodiments may be configured to determine whether a change to a portion of a code base affects the overall characterization of the code base or how high up the hierarchy of intermediate representations updates need to extend to correctly reflect that change. In some embodiments a DAG of a first version of the codebase is constructed, a DAG of a second version of the codebase is constructed, and a third DAG is constructed that represents all modified nodes (files/folders) and affected dependents. In this manner the minimal set of nodes potentially to be updated may be unambiguously identified and a processing pipeline can traverse the "diff DAG" in a manner similar to how greenfield documentation generation is produced.

In some embodiments, the components of the transpiler 12 may be coordinated by the controller 42, which in some cases may execute the processes described below in cooperation with the other illustrated components of the transpiler 12. In some embodiments, the controller 42 may be a main program of the transpiler 12. Or a task management engine that assigns workload to the different components and elastically scales the number of instances of the other components illustrated to adapt to workload.

In some cases, the transpiler 12 may bridge between structured language content in the code base and natural language content as output. Generally, natural languages (like English) have complex grammatical structures that can be irregular and contain exceptions. In contrast, structured languages (like programming languages) follow strict syntactic rules that are designed to be consistent and free from exceptions. Any violation of these rules typically results in an immediate "error" (for instance, a compiler error in a programming language).

Some embodiments of the computing environment 10 of FIG. 1 may include a retrieval augmented generation system 49. In some cases, the system 49 may be operative to generate text about a code base or other specified corpus using retrieval augmented generation that benefits from IRs like those described above. In some cases, pre-generating and indexing these IRs before queries are received may afford relatively low-latency, high-quality responses to queries that benefit from those IRs. This is in contrast to retrieval augmented generation that is solely based on the raw source text and, as a result, does not identify the appropriate source text chunks for use in generation in many cases, because the search does not benefit from documentation generated about the source text. Furthermore, returning human language descriptions instead of or tandem with raw source code can lead to higher quality content generation. Pre-computing these IRs (such as natural language documentation, or documentation in latent space that is not human readable) and indexing them is expected to afford relatively low-latency responses with high-relevance responses at query time. For example, queries may be serviced within less than 30 seconds, like less than 500 milliseconds, or less than 50 milliseconds. Furthermore, IRs or content can be pre-computed in a manner optimized and expected to improve difficult real-time queries from users. This can be achieved, with some embodiments, by making these IRs available to search in a RAG pipeline as described herein. In some cases, pre-computed content can be associated with tools the LLMs (or other language models) can call directly and independently of search. For example, useful high-level content that can only be built through exhaustive analysis may include an overall architecture description, exhaustive description of interfaces and implemented API endpoints, comprehensive getting started guide, and system overviews. This kind of content, in some embodiments, can be pre-computed by the transpiler and made available through explicit tools for the LLMs in such a manner that LLMs are configured to operate with state-of-the-art tools. In this manner, in some embodiments, an LLM-powered agent is expected to very effectively answer questions quickly from a user about architecture of a huge codebase by consulting the architecture document through a dedicated tool.

In some embodiments, the retrieval augmented generation system 49 may include a search engine 43, an API server 51 (e.g., like the API server 24 described above), a web server 55 (e.g., like the web server 26) described above, and a generator 53 (e.g., like the generator 38 described above). In some embodiments, the generator 53 may be operative to generate natural language text in cooperation with the search engine 43 by directing the search engine 43 to search for portions of a code base or other corpus to be included in, or otherwise help form, context paired with prompts to the foundation model 20, which may be the same foundation model 20 used by the transpiler 12 or other foundation models.

In some cases, the retrieval augmented generation system 49 is integrated with the transpiler 12 in a single system, such as a corpus-analysis application that provides both pre-computed documentation about a corpus and can generate additional documentation in real time, for instance, in response to user prompts or programmatic prompts.

In some cases, the search engine 43 may use IRs of parts of a code base to decorate those parts for purposes of facilitating search of the code base. Some embodiments may determine which parts of a code base are responsive to a query (e.g., nodes of a DAG or symbols within a file) with reference to those IRs as an intermediate step indexing into the code base, rather than keyword, semantic, or hybrid search in isolation against the codebase itself or a chunked and embedded version of solely the codebase itself. The search results may be used, for example, for retrieval augmented generation, for instance with the foundation model 20; for navigating the code base, for instance in an independent development environment presenting a user interface on the user computer 14; or for navigating the code repository 16 or searching therein, among other use cases.

In some embodiments, the search engine 43 includes an indexer 44. In some cases, the indexer 44 may create an index to expedite subsequent searches. In some cases, the search engine 43 may create an index when a new code base is received or a code base is updated. In some embodiments, the index may associate, for example, on a one-to-one basis, portions of or all of intermediate representations with the parts of the code base those intermediate representations characterize. For example, each intermediate representation may be associated with one and only one part of the code base or one and only one collection of parts, for instance, at higher levels of the hierarchy in the data structure shown in FIG. 3. In some embodiments, a DAG is formed from the file tree where nodes of the DAG correspond to files and folders of the codebase and all (or some) IRs are associated with a particular node of the DAG. In some such embodiments, there is a 1:many relationship between DAG nodes (and thus file or folder in the file tree) and thus it can be used to fetch raw source code associated with any IR surfaced in a search query or to fetch any IRs associated with a part of raw source code surfaced in a search query. In some cases, the index may be implemented in a data structure configured to expedite data access, such as a prefix tree, a hash table, or other associative data structure. In some cases, key values in the index may specify or otherwise correspond to intermediate representations, and associated values may specify or include the parts of the code base that are characterized by those intermediate representations. In some cases, the index may be formed by populating the vector database 45 for vector search. In some embodiments, chunked source code and chunked IR descriptions are stored in the same vector database and can be semantically searched simultaneously. In some embodiments, chunked source code and chunked IR descriptions can be configured to be semantically searched separately through filters. In some embodiments, LLM agents can be configured to search one, the other, or both as agent tools.

In some embodiments, the search engine 43 may include an encoder 46 and a vector database 45. In some embodiments, the encoder 46 may be operative to receive as input unstructured natural language text, such as an intermediate representation or a query received from user computer 14. The encoder may be configured and trained to transform that input into one or more vectors in an embedding space. In some embodiments input text or characters are tokenized according to one or more tokenizing schemes associated with one or more embedding models used to transform directly token streams to vectors in an embedding space. The embedding space may be a latent space with a manifold in which proximity between points corresponds to semantic similarity. In some embodiments, the vector database 45 may associate the resulting vectors with their intermediate representations and their corresponding entries in the index created by indexer 44.

Some embodiments may employ encoders to transform natural language text into a numerical representation within an embedding space, where proximity between points corresponds to semantic similarity. An encoder may process input text through a series of transformation steps that extract and encode semantic features into a dense vector representation. The encoder may be implemented using various models, such as transformer-based architectures, recurrent neural networks, or convolutional networks, each of which applies distinct computational mechanisms to derive embeddings.

Some embodiments may use a transformer-based encoder, where an input text sequence is first tokenized into subword units and mapped to initial embeddings through a learned lookup table. Each token embedding may be augmented with positional encodings that indicate the token's relative or absolute position within the sequence. The token representations may then be processed through multiple layers of self-attention mechanisms, where each token attends to all other tokens in the sequence. In each self-attention layer, query, key, and value vectors may be computed by applying learned projection matrices to token embeddings, and attention scores may be computed based on scaled dot products between queries and keys. The weighted sum of value vectors may then be used to update token representations. Subsequent layers may refine these representations by aggregating contextual dependencies across the sequence. A final projection layer may map the transformed representations into an embedding space, where distances between embeddings reflect semantic similarity based on learned relationships among words, phrases, or sentences.

Some embodiments may apply bidirectional recurrent neural networks, such as long short-term memory (LSTM) or gated recurrent unit (GRU) networks, as encoders. An input text sequence may be processed token by token, where each token is mapped to an embedding and passed through forward and backward recurrent layers. The recurrent layers may maintain hidden states that capture contextual dependencies over time. The final hidden states, or a weighted aggregation of intermediate states, may serve as an embedding for the entire text sequence. In some implementations, attention mechanisms may be incorporated to dynamically weight different parts of the sequence when computing the final representation.

Some embodiments may use convolutional encoders, where input text sequences are first mapped to token embeddings, then processed through one or more convolutional layers with learned filters. Each filter may capture local patterns of word co-occurrence over a fixed window, and multiple filters may extract diverse linguistic features. The convolutional outputs may be aggregated using pooling operations, such as max-pooling or average-pooling, to produce a fixed-length embedding. Some implementations may apply dilated convolutions or residual connections to capture long-range dependencies more effectively.

Some embodiments may refine embeddings using contrastive learning or supervised fine-tuning. In contrastive learning, an encoder may be trained to map semantically similar texts closer together while pushing dissimilar texts apart. This may be achieved by optimizing a loss function such as contrastive loss or triplet loss, where pairs or triplets of text samples are compared based on their distance in the embedding space. In supervised fine-tuning, labeled datasets may be used to adjust embedding representations such that encodings align with specific downstream tasks, such as sentiment classification or named entity recognition.

In some cases, the vector database 45 may be configured to facilitate relatively fast proximity-based searches. For instance, identifying a subset of vectors within a threshold distance or that are closest to a query vector within the embedding space. In some embodiments, the vector database 45 may implement, for example, hierarchical navigable small world search to facilitate relatively fast retrieval.

In some embodiments, an index may organize embedding vectors into a multi-layer graph structure that affords logarithmic search complexity by progressively refining candidate neighbors at different levels of granularity. The search process may be divided into an indexing phase, in which the graph is constructed, and a query phase, in which nearest neighbors are retrieved by traversing the graph.

Some embodiments may construct the graph in an incremental manner, where each data point is inserted sequentially while maintaining the graph's navigability. Upon inserting a new point, an entry layer may be selected based on a probabilistic distribution, where higher layers contain progressively fewer points. A new point may first be connected to the sparsest top layer and then progressively linked downward to more densely populated layers. During insertion, some embodiments may use a greedy search to identify the nearest neighbors of the new point (i.e., embedding vector) within the current layer, followed by establishing bidirectional edges between the new point and its closest neighbors. The number of edges per node may be controlled using a configurable maximum degree parameter, ensuring a balance between search efficiency and memory consumption. Some embodiments may periodically prune edges based on heuristic criteria, such as minimizing graph diameter or maintaining diversity among connected neighbors.

Some embodiments may conduct a query search by starting at the sparsest top layer and progressively descending to denser lower layers. The search may begin at an entry point, which may be a designated node or a randomly selected high-layer node. At each layer, the query embedding may be compared to neighboring nodes using a distance metric, such as cosine similarity or Euclidean distance. A greedy best-first search may be employed, where the current closest neighbor is iteratively updated as long as a closer candidate is found. Once the bottom-most layer is reached, an expansion step may refine the candidate set by exploring additional nearby nodes until the desired number of nearest neighbors is retrieved. Some implementations may use an ef parameter to control the search breadth, where a higher ef value allows for more exhaustive exploration at the cost of increased computation.

Some embodiments may optimize search performance by leveraging multi-threading to parallelize both graph construction and query execution. During indexing, different threads may independently insert data points while synchronizing graph updates to avoid conflicts. During querying, multiple threads may concurrently explore different search paths, merging results upon completion. Some implementations may apply SIMD (single instruction, multiple data) operations or graphics processing unit (GPU) acceleration to enhance distance computations, particularly when working with large-scale embedding spaces.

Some embodiments may adaptively maintain the graph by dynamically inserting or deleting points as new data becomes available. When a deletion operation is performed, the affected node's edges may be redistributed among remaining neighbors to preserve the graph's connectivity. Some implementations may periodically rebuild the graph to remove redundant or outdated connections, thereby improving search efficiency. In cases where data distributions shift over time, some embodiments may apply reinforcement learning techniques to adjust node connections based on query patterns.

Some embodiments may integrate HNSW search with other retrieval techniques to enhance overall system performance. For instance, an initial Bloom filter check may be applied to quickly rule out non-matching candidates before invoking the HNSW search. Some implementations may use a hybrid approach where an HNSW index is combined with a traditional inverted index, allowing for both semantic and exact-match search capabilities. Some embodiments may further apply post-processing steps, such as reranking retrieved neighbors using a secondary similarity model or applying diversity constraints to avoid redundant results.

In some embodiments the search engine 43 may include a query preprocessor 47 that receives raw queries from the user computer 14 to modify the query to facilitate subsequent steps of a search. Examples include removing stop words, adding synonyms to query terms, expanding on the query with additional context about the code base, session state, or the user's profile, or the like.

Figure 2:
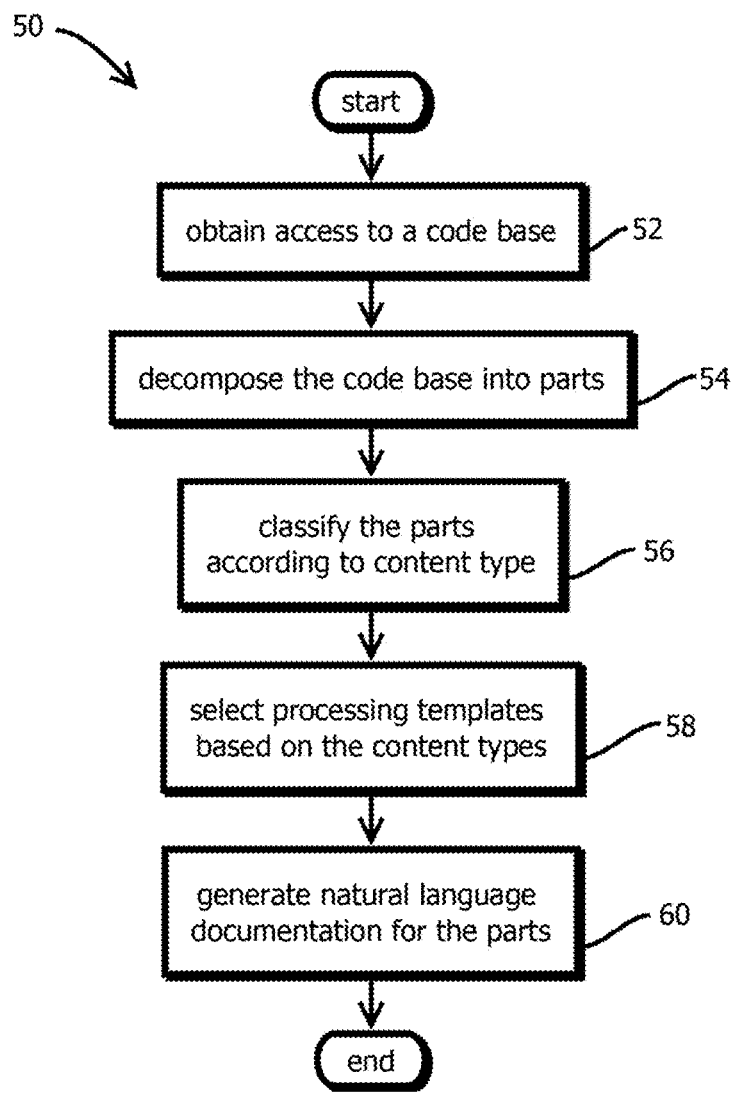
FIG. 2 illustrates an example of a process to generate documentation for a code base in accordance with some embodiments of the present techniques.

FIG. 2 is a flowchart illustrating a process 50 that may be performed by the transpiler 12 discussed above with reference to FIG. 1. Like the other processes described herein, the operations of the process 50 may be performed in a different order, steps may be omitted, additional steps may be added, combinations of steps may be performed concurrently, the steps may be performed serially, and these steps may be replicated, which is not to suggest that any other feature described herein is not also amenable to variation.

The process 50 may begin with a user requesting that documentation be generated for a code base. The request may specify the code base and supply credentials by which the code base is accessed in a repository, like repository 16 above at the direction of user computer 14 above discussed with reference to FIG. 1. In some cases, the process 50 may be initiated programmatically, for example, in response to code being added to a code base or a code base being instantiated. The process 50 may begin with a user requesting that documentation be generated for a code base or a code base being instantiated.

As noted, the process 50 may include obtaining access to a code base as indicated by block 52. This may include authenticating under a user's account in a code repository. Obtaining access to the code base may be followed by downloading or uploading portions of the code base or the entire code base. Obtaining access to a code base can entail only being able to access a subset of a code base or the entire code base may be accessible. In some cases, the code base may be resident on a computing device executing the process 50. In some embodiments, the process 50 may be executed by a code repository, independent development environment, code completion tool, or other code generation tool, or various other forms of DevOps or orchestration tooling, including therein a transpiler 12 like that described above.

In some embodiments, the process 50 may include decomposing the code base into parts, as indicated by block 54. As noted above, decomposing may entail decomposing at the level of files and folders in a hierarchical directory structure such that the relationship between parent folders and child files and folders are kept. In some embodiments a directed acyclic graph (DAG) is constructed from the file and folder structure where each file or folder is a node in the DAG. Such a DAG may be unambiguously constructed for any codebase regardless of size, shape, and contents. Decomposing may further entail more granular decomposition inside of a file, such as at symbol boundaries such as at data structure, variable, functions or method, or other objects or other delimiters within a code base. This kind of decomposition may depend on the details of the language or otherwise semantic representation of the character stream that constitutes a file. In some embodiments, symbol-based decomposition is accomplished using static analysis tools such as parsers and compiler frontends. In some embodiments, language models may be used for part or all of the symbol parsing. In some embodiments, decomposing the code base into parts may include decomposing the code base into non overlapping parts or in some cases some of the parts may overlap one another. For example, a code base may be decomposed into both individual functions within a file and into a part corresponding to the entire file, or in some cases, a given function may be included in several different parts into which a file is decomposed. In some embodiments, a first file tree-based DAG decomposition provides a primary structure to represent any codebase and to provide primary traversal through topological sorting. In some embodiments topological traversal (forward or reverse direction) is used to traverse the codebase during processing passes of the transpiler. In some embodiments, secondary methods of decomposition, such as symbol parsing and AST generation are also used as part of the codebase processing passes of the transpiler. In some embodiments these secondary decompositions are used for processing and in some embodiments for processing and traversal.

Some embodiments may include classifying the parts according to content type, as indicated by block 56. In some cases, the parts may be classified into one and only one category in a predefined ontology, or in some cases, the parts may be tagged with multiple categories, for instance, in a hierarchical taxonomy in which the categories are not mutually exclusive, for instance, with genus and species relationships. Classification may be performed with a variety of techniques, including with regular expressions, size analysis (e.g., lines of code, byte count, symbol count) or by inputting the parts into a language model like those described elsewhere herein. In some cases, classification may be based upon file extensions of files in a directory structure, for example, classifying files with a .xml extension or .json extension as configuration files or metadata, and classifying files with a .py or .pyc extension as source code. In some cases, the classification may also be based on, and indicate, the language or other protocol or standard in use, for instance, within the genus of source code, there may be species of classifications for Java, Python, C, C++, Rust, Ruby, C#, Go, Erlang, Verilog, SystemVerilog and other programming languages or hardware description languages. Similarly, within the genus of configuration files, there may be species of JSON, XML, YAML, and the like. In some cases, some of these species may be replicated under different genera, for instance, metadata may be both, for instance, JSON may be used both for metadata and for configuration data within a code base.

In some cases, the classification may be based on how the code is used, for example, whether the code relates to a back-end or a front-end of an application or to unit tests or business logic code; whether the code is intended to execute client-side or server-side; whether the code is called by other code or appears to be dormant, vestigial code; whether the code executes on or controls various types of hardware, like drivers controlling peripherals, FPGAs, application-specific integrated circuits, tensor processing units, AI accelerators, embedded systems, and the like. In some cases, the classification is based on a level of computing abstraction at which the code runs, for example, machine code, code that runs in user space, code that runs in kernel space, or the like. In some cases, the classification may be based on relevance to certain concepts or kinds of documentation that may be desired, for example, whether code is important for understanding hardware-software interfaces, is important for understanding the core architecture of the codebase, is relevant as a target for legacy modernization methods, is important when building a getting started guide, is important for security considerations, is important for understanding the testing strategy of the codebase, is important for understanding critical configurations and global state required, and the like. In some cases, the classification may be based on tagging the concrete presence of a specific type of content such as API endpoints, tests, and public-facing interfaces. In some cases, the classification may describe the dominant style of programming such as functional, object-oriented, or procedural paradigms. In some cases, the classification may reflect the size and complexity of the code, such as "tshirt-sizing" a file as small, medium, or large.

Some embodiments may select processing templates based on the content types, as indicated by block 58. As noted above, processing templates may include prompts or chains of prompts to a language model to be supplied with the part to the language model to elicit responses used to build IRs such as forms of documentation. In some cases, the processing templates may specify which language model is to be used. For instance, selecting among different fine-tuned or otherwise tailored language models for different types of content and supplying the corresponding prompt language. In some cases, the processing templates may also specify other types of tooling to be used to process the part, in some cases, in context of the overall code base. Examples include static analysis tools, like linters, security analyzers, code quality tools, compiler tools, parsers, and the like. Other examples include other forms of software testing and quality assurance tools, like functional testing tools, unit testing tools, regression testing tools, performance testing tools, security testing tools, test management tools, API testing tools, Continuous Integration/Continuous Delivery (CI/CD) Tools, Bug Tracking and Issue Management Tools, Usability and Accessibility Testing Tools, and the like. In some cases, such tools may be specified by a processing template, along with a configuration for applying the tool, and outputs may be paired with specified prompts in subsequent steps.

In some cases, content types and tools are used to determine which branch in the processing template to take in the operation of a multi-branch and multi-step processing template at a variety of scales. For example, at the entire codebase level, a high-level categorization of "web application" may branch to an entire set of processing templates (documentation templates, prompts, static analysis tools) that affect the processing of the entire codebase. In another example, at an individual file level, a size or complexity label may determine the template to be followed for that file, different to exploit expectations based on complexity level. In another example, at an individual file level, detecting classification as metadata or configuration file may dispatch to a processing template with prompts specific to those concepts while a classification of a particular programming language source code file may dispatch to a processing template that targets producing low-level technical documentation of symbols using an AST parser tool or symbol table extracting tool. In another example, when building content to describe a particular parsed symbol for a particular programming language in a particular file, a particular prompt may be selected with a specific output schema and structure to document that symbol will be chosen and provided to the LLM when generating content. In this manner, in some embodiments, enormous codebases can be documented systematically, consistently, from the ground up, and by exploiting analyzable knowledge at every level of extraction when crafting context and calls to foundation models.

Some embodiments may then generate natural language documentation for the parts as indicated by block 60. As noted above, the act of generating can be accomplished by invoking a third-party service, such as one operating a foundation model, and receiving the response without actually executing that foundation model oneself. In some cases, the output of the processing templates may be supplied to the generative model, such as a diffusion model or language model. In some cases, the processing template may specify a chain of thought or chain of prompts, in some cases with branching logic in which a sequence of prompts is supplied to the language model or a set of specialized language models, where that sequence is formed based on output of earlier submissions in the sequence.

In some embodiments, the generated documentation may be stored in memory as well as long-term storage, such as a database, and transmitted over a network to the user or to the code repository, hosting the code base at issue. In some embodiments, the documentation, or parts thereof, may be presented in a user interface to a user on a user computing device in which the documentation is shown in one portion of a screen and the corresponding parts of code are shown in another. The user may be invited through the user interface to edit the documentation or request model-generated modifications to the documentation. In some cases, those edits and requests may be stored and used for subsequent fine-tuning or other training operations of the language models or the processing templates such as reinforcement learning from human feedback (RLHF).

Figure 3:
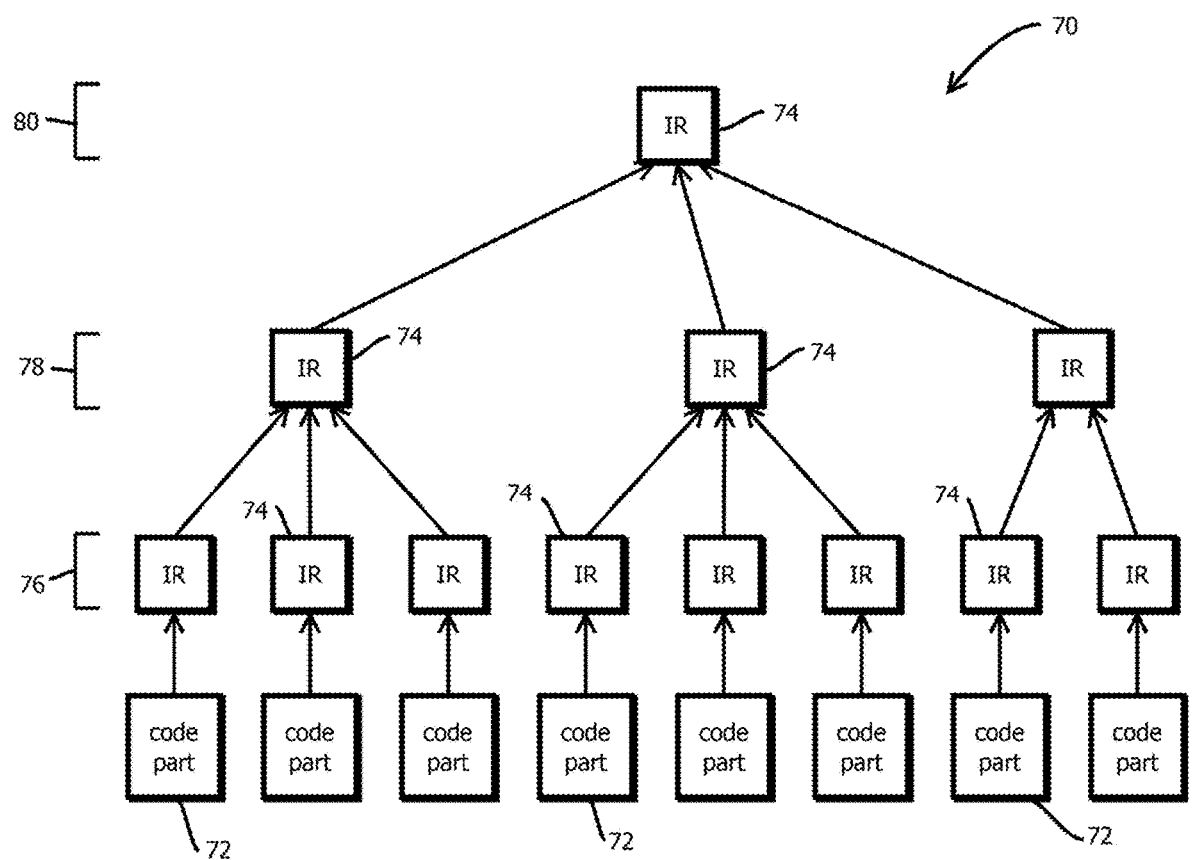
FIG. 3 illustrates a hierarchical pre-structure of intermediate representations documenting various parts of a code base in accordance with some embodiments of the present techniques.

FIG. 3 illustrates a data structure that may be formed in memory of the transpiler 12 when executing the processes herein. In some embodiments, the data structure 70 may be a hierarchical tree data structure based on a set of code parts 72 obtained by decomposing a code base. In some cases, each of the code parts 72 may have a corresponding IR 74 in a level 76 of the data structure 70. These IRs 74 may be based on and characterize, for instance, summarize, describe, or explain the corresponding lower levels of the hierarchy in the data structure 70. So, for example, IRs 74 in level 76 may characterize the corresponding code parts 72 indicated in the figure, the intermediate representations 74 in level 78 may characterize the IRs 74 in level 76 with which they are associated as indicated by arrows in FIG. 3. Similarly, the IRs 74 in level 80 may characterize those intermediate representations in level 78. Thus, IR 74 may characterize all of the illustrated code parts 72. It is expected that in some embodiments, the IRs at higher levels of the data structure 70 will be shorter and less verbose than the content they characterize, for instance, operating as summaries or explainers. In some cases, multiple instances of the data structure 70 may be created for a given code base with each instance corresponding to a different purpose, for example, summarization, explanation, tracing program flow, describing memory or processor utilization, describing only one kind of concept like data structures or API endpoints, describing the components from the perspective of a user interface, latency, bandwidth, database usage, privacy, security, business logic, or the like.

In some cases, some IRs in one instance of a data structure 70 may characterize those lower-level intermediate representations in other such instances. For example, with both intermediate representations related to security and user interfaces contributing to an intermediate representation describing the overall function of the code base.

Figure 4:
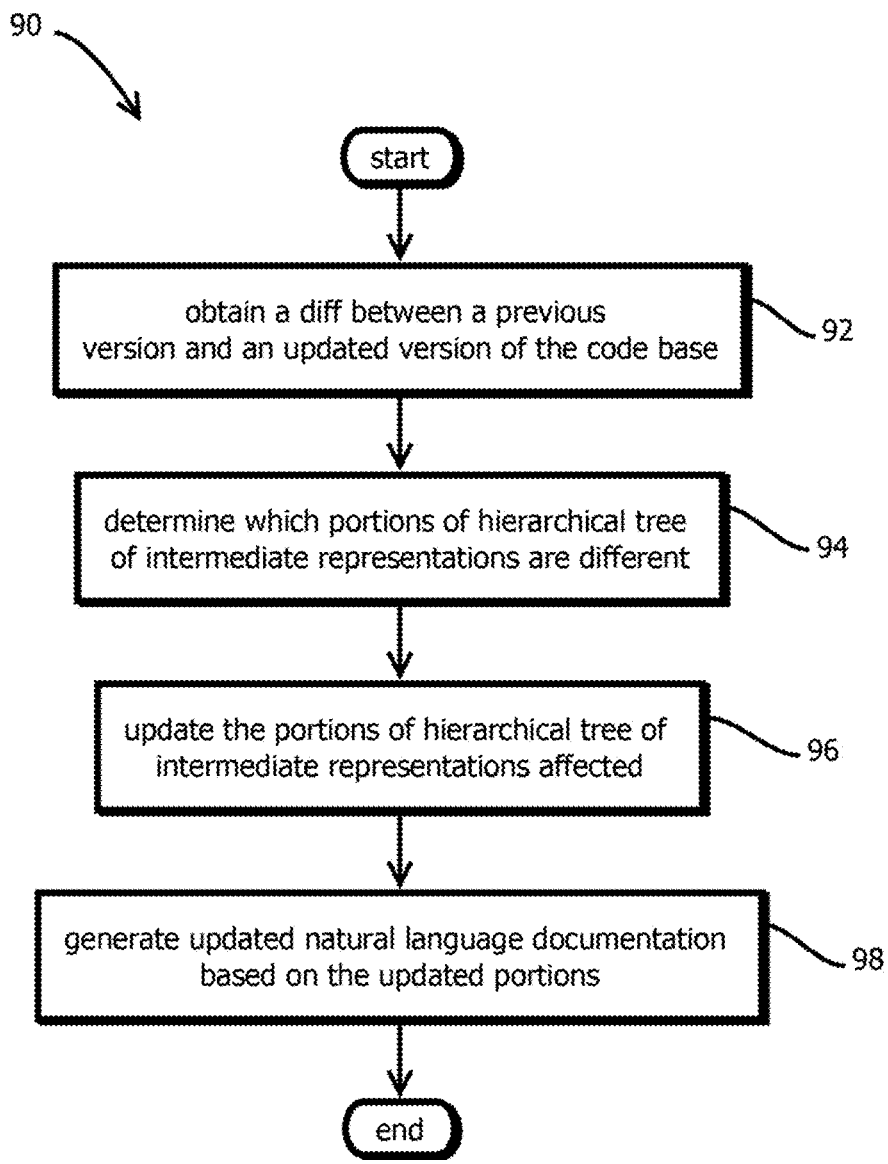
FIG. 4 illustrates an example of a process by which documentation may be updated in response to an update to a code base in accordance with some embodiments of the present techniques.

FIG. 4 illustrates an example of a process 90 that may also be executed by the transpiler 12 of FIG. 1 or other systems. In some embodiments, the process 90 may update documentation in response to updates to a code base.

Some embodiments may include obtaining a diff between a previous version and an updated version of the code base as indicated by block 92. This diff in some cases may be obtained from the code repository hosting the code base, for example, at the instruction of a user or automatically in response to code being merged into that code base, for instance, via the above-described API server. 24. In some embodiments, the diff information may be obtained through version control software tools such as git, taking the form of a patch file or the like. In some embodiments, the entire state of the codebase at a first state and the entire state of the codebase at a second state will be obtained and a diff internally computed by the transpiler. In some embodiments, an internally computed diff may take the form of a file tree DAG, representing just the components of the file tree DAG from a first state of the code that must be updated or added in a traversable form that, in some embodiments, affords a systematic and unambiguous method to update documentation and IRs only associated with the code that changed.

Some embodiments may determine which portions of the hierarchical tree of IRs are different under the different version of the code base as indicated by block 94. In some embodiments this may include traversing up the tree of FIG. 3 and evaluating at each level whether any associated lower-level portions have changed and then determining IRs based on those changes and comparing the new intermediate representation to an older version to determine whether they are semantically different. Semantic differences may be determined for example with a language model and corresponding prompt or based on distance in an embedding space like those described above, for example longer than a threshold distance computed by cosine distance, Euclidean distance, Minkowski distance, Manhattan distance, or the like. In some embodiments, a language model may be used to directly modify existing IRs and documentation based on diff information. In some embodiments, IRs and documentation for entire files may be fully regenerated from scratch while keeping such regeneration isolated to files that had changes of a certain level, degree, or kind.

Some embodiments may update the portions of the hierarchical tree of IRs that are determined to be different, as indicated by block 96. In some cases, if a given intermediate representation is not different enough to be classified as different in step 94, then that portion and higher portions in the tree may not be updated to limit how much of the data structure 70 of FIG. 3 is updated and conserve computing and memory resources as well as the sense of consistency for users.

Some embodiments may generate updated natural language documentation based on the updated portions as indicated by block 98. In some cases, the updated natural language documentation may include a set of release notes, pull request documentation, or other diff-oriented description specifying what changed. In some cases, the updated documentation may also include updated documentation for the overall code base. Generating here may entail the operations described above in FIG. 2 with reference to step 60 and storing and editing in the manner described above.

Figure 5:
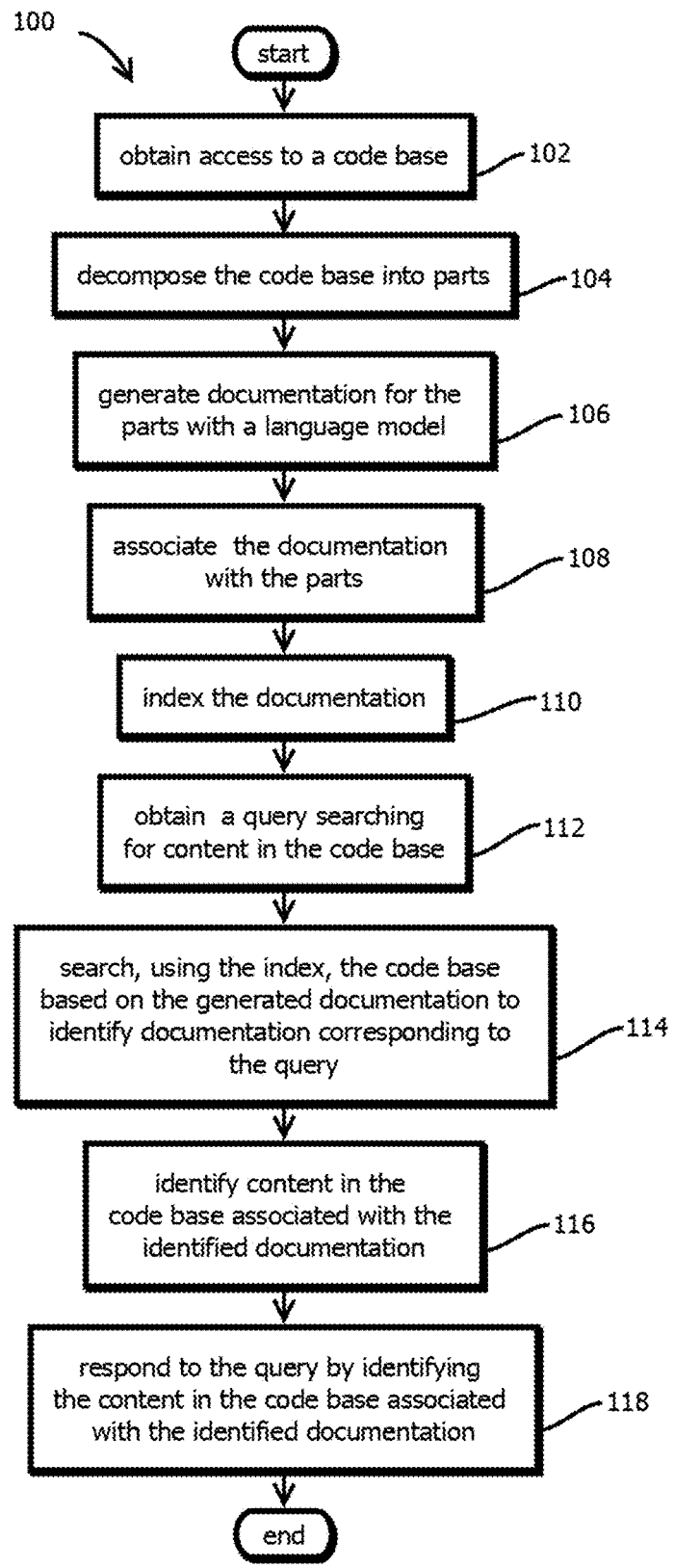
FIG. 5 illustrates an example of a process by which a code base may be searched in accordance with some embodiments of the present techniques.

FIG. 5 is an example process 100 that may be executed by the search engine 43 described above with reference to FIG. 1 or with other systems. In some embodiments the process 100 may be used to search or otherwise navigate through a code base by decorating content of the code base with IRs created with processes like those described above with reference to FIGS. 2 and 4. In some embodiments, the process 100 may begin with receiving a query, for instance, from user computer 14 described above or from other portions of the above described transpiler 12, for example, to facilitate generation of other IRs.

In some embodiments the process 100 includes obtaining access to a code base as indicated by block 102. This process, in some cases, may correspond to step 52 in FIG. 2.

In some embodiments, the process 100 may include decomposing the code base into parts as indicated by block 104, which may correspond to step 54 in FIG. 2, and generating documentation for the parts with a language model as indicated by block 106, which may correspond to step 60 in FIG. 2. In some embodiments, the other aspects of FIG. 2 may also be implemented, which is not to suggest that any other described feature is required in all embodiments.

Some embodiments may associate the documentation or other forms of IRs with the parts as indicated by block 108. In some cases, the documentation is natural language documentation summarizing explaining or otherwise characterizing the parts of the code base. In some embodiments, the IR against which search is conducted is not in a natural language. For example, the documentation for this purpose may be in the form of one or more (e.g., a sequence of) embedding vectors created by the above-described encoder 46. In some cases, the documentation may be generated without forming natural language text for this purpose. In some cases, the documentation may have a one-to-one association with one of the parts or one or more of the parts characterized by that documentation.

Some embodiments may index the documentation as indicated by block 110, which may be done by the indexer 44 described above with reference to FIG. 1. In some cases, the index may expedite access to responsive parts of the documentation. Examples of indexes include those based on hash functions, prefix trees, binary search trees, and the like, or populating the vector database.

In some cases, the index may be formed as a pre-processing step in advance of receiving a query in which the index is used. In some cases, indexing may include calculating embedding vectors in an embedding space with the above-described encoder 46. In some cases, the embedding space may have more than 10, for example, more than 100 or more than 200 dimensions, and proximity in the embedding space may correspond to semantic similarity of inputs that produce embedding vectors having that proximity.

Some embodiments may obtain a query searching for content in the code base, as indicated by block 112. The query may be obtained from a user or from a program. In some cases, the query may be expressed in natural language text that is unstructured. As noted above, some embodiments may include pre-processing the query to facilitate subsequent searching.

Some embodiments may search using the index, the code base, based on the generated documentation to identify documentation corresponding to the query as indicated by block 114. In some cases, searching may include computing an embedding vector based on the query. For instance, by inputting the query into the above-described encoder 46 discussed with reference to FIG. 1.

Some embodiments may then search by identifying embedding vectors in the above vector database 45 or index, which in some cases may be implemented in the vector database that have some proximal relationship to the embedding vector of the query. Some embodiments may determine which embedding vectors of the documentation are closest to the embedding vector of the query. Some embodiments may determine which embedding vectors of the documentation are within a threshold distance of the embedding vector of the query in the embedding space. Distance may be determined with a variety of approaches including cosine distance, Euclidean distance, Minkowski distance, and Manhattan distance. As noted above, this search based on distance and embedding space may be implemented with techniques like hierarchical navigable small world navigation to expedite queries as pairwise searching a vector database with potentially millions of vectors and computing distances to a query vector may otherwise be relatively compute-intensive and higher latency than is desirable. In some cases, other types of search, like keyword search, may be implemented. In some cases, keyword search may be combined with the above-described vector-based search in an embedding space.

Some embodiments may identify content in the code base associated with the documentation identified in the search step 114, as indicated by block 116. For example, the search may determine that a given unit of documentation is closest to the query vector in the embedding space and then identify the part of the code base with which that documentation was generated. In some cases, the identified content may be ranked, for instance, based on proximity in the embedding space between corresponding embedding vectors with the query embedding vector, with closer content having higher ranking. Some embodiments may de-dupe search results to remove or combine duplicates.

Some embodiments may respond to the query by identifying the content in the code base associated with the identified documentation, as indicated by block 118. This may include storing in memory the content in the code base so associated or storing in memory pointers thereto. Identifying the content may include sending that content or sending pointers (like cites) thereto. The search results described by block 118 may be used for a variety of purposes, including navigating the code base within an independent development environment, searching among code bases in a code repository, or retrieval augmented generation for various purposes, examples including generating additional documentation, or reasoning about the code base with a reasoning model.

Some embodiments may implement a structured document generation process leveraging LLMs (or other language models) in a multi-stage approach. In some embodiments, a first stage may generate a structured outline defining sections and subsections of the document, with each section and subsection being associated with one or more corresponding prompts. The outline generation process may be performed separately from content generation, allowing refinement of the document's structure without premature introduction of content. Some embodiments may execute this process iteratively, adjusting the hierarchy, ordering, and granularity of sections to align with a desired document type and relevant knowledge sources, such as codebases, research materials, or prior documents. The outline generation phase may incorporate constraints, metadata, or annotations that inform later content generation, ensuring that prompts associated with each section guide the LLM in a structured and contextually relevant manner. In some embodiments, the sections and sub-sections are iterated on first and potentially with a user in the loop as a first step. As a second step, in some embodiments, when the section outlines are complete and accepted, the one or more prompts associated with each section or subsection may be produced, exploiting knowledge of the entire, settled, outline structure when designing prompts.

Once an outline has been developed, some embodiments may proceed to content generation by iterating over the sections and executing their associated prompts. The LLM may generate text in a modular fashion, constrained within each predefined section or subsection, thereby maintaining structural coherence and consistency. Some embodiments may further refine this stage by incorporating feedback loops, where generated content is reviewed and used to refine either the outline or the prompts. Execution of prompts may be performed sequentially or in parallel, depending on computational resources and dependencies between sections. In some embodiments, contextual awareness may be maintained across sections by dynamically adjusting prompts based on prior content, ensuring alignment of terminology, style, and logical progression.

The structured approach to document generation may improve coherence across lengthy documents by treating the outline as a foundational planning phase. The structured approach to document generation may afford production of documents of considerable length such as greater than 10 pages, greater than 100 pages, or greater than 1000 pages automatically with LLMs in a manner not possible with on prompt by associating LLM calls with building blocks of an outline that can represent arbitrarily sized documents. Some embodiments may incorporate additional optimization techniques, such as weighting prompts differently based on section importance, dynamically modifying prompt instructions based on generated content, or enforcing consistency constraints across sections through programmatic validation steps. Some embodiments may apply post-processing techniques, including re-ranking generated passages for coherence, applying summarization models to increase conciseness, or performing automated consistency checks across references and citations.

In some cases, the outline may be characterized as a "smart outline." The outline may be generated as follows: First, a user prompt in a text box or wizard/flow is used to get a description of the kind of document the user wants to produce. The user may also specify the codebases and other assets that should be in scope and considered. Next, the process may enter outline section creation mode, where a dedicated LLM agent may be used to produce outline section headers. Embodiments may use search and RAG to consult the in-scope assets to build the most relevant section headers with the concrete scope in view. Some embodiments may then iterate with feedback from the user on the sections, in some cases. Some embodiments may enter prompt creation ("Smart Instructions") mode for the sections. Some embodiments may iterate through the sections and subsections and dispatch to a prompt creation agent for each. The agent may be tasked with creating one or more distinct prompts to build a block of content for that section. Embodiments may consult the sources to make relevant, and specify details like the output kind for each block (e.g., general text, table, diagram, list, etc.). The output may be the prompts another LLM will use to actually create content. Some embodiments may iterate with feedback from the user on the set of all prompts in all of the sections. Some embodiments may execute all prompts in all sections (in some cases stepped through manually by the user) in series or concurrently and insert the resultant blocks of content in the corresponding section of a document. In this manner, a full document with content and section headers that map to the original outline may be automatically created in a very structured way, where consultation of the in-scope assets was used each step of the way.

Some embodiments may extend this methodology to specialized domains, incorporating domain-specific prompt engineering to tailor section-level prompts to particular fields, such as legal drafting, technical documentation, or research synthesis. Additional constraints may be introduced to ensure regulatory compliance, standard formatting, or cross-referencing between sections. Some implementations may incorporate reinforcement mechanisms, where user feedback on prior document generations informs future iterations, allowing for iterative refinement over time.

Some embodiments may implement an iterative content review and synthesis approach that incrementally refines a target output through sequential incorporation of source materials. In some embodiments, rather than relying on retrieval-augmented generation (RAG) techniques that identify a fixed number of top-ranked documents via semantic search, content ingestion may proceed exhaustively, without predefined constraints on the number of retrieved sources. Each piece of content may be processed individually by a large language model (LLM), with the model determining how, if at all, the target output should be updated in response to newly reviewed material. This approach may avoid limitations associated with batch retrieval, where a single prompt containing multiple retrieved documents may overwhelm context windows or lead to shallow synthesis.

Some embodiments may employ a structured review process in which an initial draft is incrementally refined as additional content is processed. At each iteration, an LLM may assess a single document or excerpt, evaluate its relevance, and determine whether modifications to the current draft are warranted. Some embodiments may apply heuristic or model-based decision rules to regulate whether content should be incorporated, reworded, synthesized, or discarded. This may include assessing factors such as semantic novelty, alignment with prior content, or contribution to completeness and coherence. Some implementations may employ memory mechanisms or external state tracking to maintain awareness of which concepts have been integrated and to avoid redundant modifications.

Categorization and tagging of content may be leveraged to guide the iteration process. Some embodiments may pre-process source materials to assign metadata labels indicating thematic relevance, factual reliability, or structural role within the broader corpus. These categorizations may inform how aggressively or conservatively an LLM integrates a given document into the evolving synthesis. Some embodiments may sequence the review process based on content categorization, prioritizing core explanatory materials before incorporating supplementary references or edge cases.

Some embodiments may implement adaptive strategies for determining iteration termination criteria. Rather than performing a fixed number of review passes, the system may assess when further refinements yield diminishing returns, potentially applying confidence scoring or stability metrics to measure the extent of content change across iterations. Post-processing steps may include consistency validation, redundancy pruning, or cross-referencing to ensure that the final output maintains logical coherence across all incorporated materials.

Some implementations may extend this method to domain-specific applications where holistic synthesis is essential, such as legal analysis, technical documentation, or research literature reviews. In such cases, the approach may be further refined through domain-aware prompt engineering, structured reasoning frameworks, or interactive user feedback loops to iteratively enhance synthesis accuracy.

Comprehend

The disclosure contemplates numerous ways a code base can be comprehended by a software system that includes generative AI components. Comprehension in this sense refers to a process whereby critical information and logical structure about a code base is extracted, distilled, and stored into various intermediate representations (IRs). This collection of IRs can then be used to generate refined, higher level, or application-specific content (e.g., in natural language) for users directly or through the action of complex Large Language Model (LLM) agents supplied with the comprehended information.

Generative AI-powered code generation and related developer tools are on the rise. This is changing how software is developed. Limitations of existing approaches such as chat bots can include requiring a user to actively and iteratively query for content, being local (tailored to individual developers) and ephemeral (learnings not captured for others).

The larger scale how, what, and why to write new code or modify it is a part of a how a business makes development decisions. This disclosure contemplates how embodiments can build up this kind of information from source code using generative AI systems and provide this to a business in a structured user interface. This is expected to allow an entire organization—not just developers—to benefit from generative AI's capabilities to understand software and explain it. At the same time, this bottom-up approach, in some embodiments, also is expected to afford steering output for highly domain-specific endeavors such as analyzing quality, security, and compliance of code with various standards; building extensions and connecting software; and providing application notes.

Code generation or similar generative AI solutions often need, or benefit from, some mechanism of focusing. For example, retrieval-augmented generation (RAG) may be used to find context to focus generative AI on building the right solution for the right task (searching, based on a prompt, a larger body of content for relevant subsets and including those relevant subsets in the context window along with a user-supplied prompt). It is helpful to appreciate where this context comes from and how this context is captured and navigated. Chunking up source content (text, code, etc.), generating embeddings, and indexing into a vector database that can be semantically searched at query time is one approach. Some embodiments build and provide the aforementioned IRs and explanatory comprehensions of source code at different levels of abstraction, and are expected to significantly improve the capabilities of LLM agent systems. (It should be emphasized, though, that there are various inventive aspects described herein, and not all aspects require the use of these IRs, which is not to suggest that any other feature is required in all embodiments.)

This disclosure contemplates bottom-up comprehension of software that starts with initial granularity at the level of individual lines of code, symbols, files, and modules that are directly described. "Describe," here, can include a wide variety of types of content, including deep and lengthy technical descriptions, broad technical summarization, and selective distillation of specific types of information (e.g., classifying such inputs into a taxonomy, extracting various fields of information, and the like). This information can then be aggregated upward in terms of scope and abstraction level to create descriptions at higher levels of granularity such as submodules, code bases, and collections of code bases. For instance, the IRs of three submodules in a module may be used to generate the IR of that module, and the IR of that module may be used along with IRs of several other modules to generate the IR of program containing all of those modules. Furthermore, as comprehension moves up the abstraction level stack, new types of comprehensions/knowledge distillation can be deployed, such as inter-dependency tracking, call graph construction, and functional descriptions of emerging capabilities that do not include technical jargon or direct references to code. Some embodiments build IRs upwards from comprehension of software source code, as well as any other such "primary" sources such as hardware specifications, application programming interface (API) specifications, schematics, or any other existing documentation. As a result, in some cases, IRs of higher-level components can be generated without directly inputting all source code contained in that higher-level component, which could exceed context window size.

Another approach contemplated in this disclosure is relative independence from a particular LLM base model. That is, methods are contemplated of interacting with a code base using LLMs to generate comprehension wherein different LLMs may be used, swapped in and out, or combined to produce the comprehended output. In some embodiments, LLMs may be fully interchangeable while in other embodiments, some comprehension strategies are tailored for or specialized for specific LLMs (base or otherwise fine-tuned) . In some cases, several LLMs may be used, each fine-tuned to generate IRs along a different dimension of code characterization, like call-graph, business logic, security, latency, extensibility, scalability, testing, etc. to produce a set of IRs for each such dimension.

Some embodiments include a programming-language to human-language compiler or transpiler. More generally, some embodiments may include a structured-language to natural-language transpiler, which may be used for source code, genetic codes (e.g., DNA and RNA sequences), mathematical notation, chemical formulas, musical notation, blueprints and schematics, and the like. Some embodiments include frontend elements, parsing source code into comprehended IRs at multiple levels of abstraction, and backend generation elements, multi-pass processing of IRs to optimize (or improve) user-facing content generation such as technical documentation, product briefs, system architecture diagrams, and dependency graphs that can be directly consumed by humans in a business. In some cases, such outputs may be further transformed into audio with text-to-speech, video or images with diffusion models, block diagrams, and the like.

Traditional software enterprises are often oriented around a unidirectional flow: business needs→product design and features→software implementations. Many elements of "technical debt" and legacy software challenges relate to the general inability to go the other direction. That is, to build up user stories, product designs, system architecture descriptions, diagrams, and business capabilities from existing source code so that initiatives can be mapped against existing state. The LLM transpiler technologies in some embodiments provide this bidirectional flow.

Single Resource Base Comprehension

Some embodiments comprise methods to comprehend individual digital resources. In some embodiments, a digital resource is a discrete software code base or repository, in others it may be documentation associated with a code base or repository, documentation of interfaces or APIs, or documentation of hardware systems that interact with or are controlled by or accessible to the software code base.

A codebase may be software ultimately targeting machine code associated with an instruction set architecture (ISA) to run on a central processing unit (CPU). It may also be specialized software targeting bespoke application specific integrated circuits (ASICs). It may also contain logic written in a hardware description language (HDL) such as System Verilog or VHDL, netlists for electronic circuits, STL files for computer aided drafting (CAD) or other CAD formats, genetic codes (e.g., DNA and RNA sequences), mathematical notation, chemical formulas, musical notation, blueprints and schematics, Unified Modeling Language diagrams, Systems Biology Graphical Notation Process Description (or Entity Relationship or Activity Flow) language expressions, collections of semantic triples in a knowledge graph, and the like. In some cases, a natural language input may first be "codified" into a structured language (collections of semantic triples in a knowledge graph formed with an LLM), before undergoing transformation into an IR.

Consuming a Resource

A resource may be provided by various means such as encountered on disk in a typical file system structure, accessible over a network via APIs, or provided in a central repository technology and vendor such as GitHub™, BitBucket™, or GitLab™.

A resource so supplied is ingested into the system (e.g., a local computer, or one or more computers, such as a collection of servers, accessed via the internet at a remote datacenter). In one embodiment, ingestion comprises first parsing the code base into a directed acyclic graph (DAG) data structure. In some embodiments, nodes of the DAG correspond exactly with the file structure on disk, i.e., files and folders of the code base, and the raw source code for each file, is associated with the node for that file, and directed edges extend from and connect nodes of folders with child files and folders therein. In other embodiments, nodes may further be associated with parsed subcomponents of a file, such as source code symbols, that have a child relationship in the graph with file. In other embodiments, nodes of the DAG correspond to capabilities or functionality previously comprehended with respect to the code base and do not necessarily mirror the original file structure.

Pre-Processing Steps

In some embodiments, one or more pre-processing or filtering stages occurs during DAG creation (or afterward) to filter nodes associated with unwanted content, such as hidden files or folders, or files and folders specified by a user to not be included in content generation. This information can be provided by a user in a file format such as .ignore files, through another configuration format, through an interactive GUI, or through other means.

In some embodiments a metadata and statistics computation stage is applied during DAG creation (or afterward) that computes and stores important metadata and statistics associated with the code base. Such metadata and statistics may include source lines of code (SLOC), character counts per file and per code base as a whole, token counts per file and per code base as a whole and per one or more embedding models, number of files and folders, and file/character/token count per programming language.

In some embodiments, these metadata and statistics are used to direct or choose the methods and algorithms applied in downstream comprehension steps or generative flows. Generative flows are discussed in subsequent sections and may be distinguished by different business logic and/or different LLMs used in the business logic. In one example, source lines of code are used to select downstream flows optimized for code bases of a given size. In another example, the set of programming languages and relative volume of code for each is used to select a downstream generative flow. In another example, an LLM is used to determine the application domain or conceptual category that a code base belongs to based on metadata and statistics provided to it.

In some embodiments, raw source code of the code base may be systematically transformed prior to reaching the "comprehend" phase. For example, code comments and non-executable elements of the code may be, pre-processor or language macros may be expanded, compiler outputs and intermediate representations may be generated.

Some embodiments may perform these operations on diffs between successive versions of code to build a history of the source code as well, in some cases ingesting comments associated with commits and associated tickets and being capable of producing a narrative about how functionality has evolved, why, and by who.

Base Comprehension of the Components of a Code Base

The disclosure contemplates various ways a code base can be comprehended with generative flows using generative AI and large language models (LLMs). These generative flows may include methods to break apart information in the target code base and distill information about the code base and its logical structure into various intermediate representations (IRs). The IRs may be shorter than the code they characterize in some cases, or in some cases, they may be longer.

These methods, in some embodiments, do not require the model to have been trained with any content being analyzed. Instead, in some embodiments, the general ability to provide information directly to a model through prompts and associated context windows is used to systematically provide the context a model needs to produce content at a local call/query level. Complex series of LLM calls can be made, in addition to traditional software business logic and non-AI tool use, to comprehend large amounts of information that do not fit into a single LLM prompt/context window.

Intermediate Representations (IRs)

An example intermediate representation (IR) described herein refers to a representation of some component of a resource consumed by the system. A resource may contain software in the form of a repository, a code base, or isolated subcomponents or code snippets but may also contain human language entities such as data sheets, manuals, and documentation as well as other forms of media such as images, videos, or audio samples.

An IR may comprise raw source code isolated at various levels of abstraction such as symbols associated with a particular programming language (global variable, function, subroutine, class, data structure), chunks of source code extracted from source code files, entire source code files, or source code associated with a logical module in a programming language that may or may not correlate with a file on disk.

An IR may comprise human language text that ranges along a longevity axis: from a single word, phrase, or sentence to long form textual descriptions. An IR may comprise human language text that ranges along an abstraction level axis: associated with a single source line of code, programming language symbol, larger chunk within a code file, an entire file or folder of a code base, an entire code base, or a collection of code bases. IRs may also comprise or include non-textual elements such as images, videos, diagrams such as architecture and block diagrams, data flow diagrams, timing diagrams, etc., and audio data. IRs may be expressed in natural language, or they may be expressed in other formats, like sequences of vectors in an embedding space like word-embedding, n-gram embedding, or sentence-embedding spaces.

In some embodiments, to expedite processing, many IRs are created concurrently (e.g., in parallel) in different threads on different cores or computers or via asynchronous cloud infrastructure, and with redundancy but separated to some degree. For example, technical summary content for a file may be described by a single sentence, single paragraph, or multi-paragraph page. In another example, a single paragraph may be generated that focuses on significantly different or orthogonal elements of a file such as dependencies and imports, business logic, data structures, etc.

In some embodiments, IRs may take the form of unformatted plain text in a human language such as English. In other embodiments, IRs may take the form of marked up or rich text formats such as Markdown. In other embodiments, IRs may take the form of a data exchange format such as JSON, YAML, XML, etc.

In some embodiments, the number of IRs is on the order of magnitude of the file and folder nodes of a code base. In other embodiments, the number of IRs generated by exceed the number of base nodes associated with a code base file structure by 1, 2, or more orders of magnitude.

IRs from Directly Walking a DAG

In some embodiments the DAG data structure is walked and IR content is generated by supplying base content into a prompt and/or context window of an LLM. The LLM is tasked with creating content for each node independently. For example, the raw source code of file nodes may be passed in directly to an LLM via the prompt mechanism. Folder nodes may have child node source content or previously generated child node content or both passed in to an LLM via the prompt mechanism. In this manner, content can be independently generated for all nodes of the DAG that represents the code base. In some embodiments, the DAG will be walked in topological order such that child nodes will always have been processed prior to encountering parent nodes. In some embodiments, the DAG may be walked in reverse topological order, for example, in secondary passes that produce structured high-level content by iteratively considering previously generated lower-level technical documentation for each node and wherein reverse topological order is advantageous to content creation. Similar approaches may be implemented by crawling tagging structures in systems that do not use foldering to organize files, e.g., with depth or breadth first search, Dijkstra's algorithm, A* keeping a list of visited nodes, or the like.

In some embodiments, IRs created from directly walking the DAG form a first, critical pass on top of which more complex IR creation can be built, including content mixing abstraction levels, content connecting inter-dependencies, and content created from LLM agents in an interactive loop. In some embodiments the first IR generation pass is open-loop and functions by parsing and visiting all source code content through the code base encountered by walking the DAG and immediately generating content in a 1:1 or 1:many context using independent and unconnected LLM calls. In other embodiments, the first IR generation pass or a subsequent IR generation pass may be closed-loop and include LLM agents iteratively producing IR content, for example, using chain-of-density, ReAct, or other LLM agent strategies.

Concurrent IR Content Creation and Separating Signals

The IR content created for a single node may, in general, have a one-to-many relationship between the node and discrete pieces of content, or IRs, created. In some embodiments, a strategy is to employ LLM agents optimized to identify and distill specific kinds of information from target content, such as source code. For example, in some embodiments, different respective LLMs may be specialized (e.g., fine-tuned) to distill information about the major logical components of a piece of source code, about the logical flow of a piece of source code, about data flow in a piece of source code, about the dependencies used in a piece of source code, about the quality of a piece of source code, about possible security vulnerabilities in a piece of source code, about performance issues in a piece of source code, about memory safety issues in a piece of source code, about possible bugs residing in a piece of source code, about compliance of the piece of source code with a target standard, about the public facing APIs in a piece of source code, about API endpoints implemented in a piece of source code, about internal private and sealed aspects of a piece of source code, or about data structures in a piece of source code, etc. Each such LLM may create a different respective IR, or outputs of such LLMs may be combined in an ensemble model to create a single IR with another LLM or selected among with a or mixture-of-experts approach.

In some embodiments, all or a subset of these specialized IRs are created. Creation may be independent and in parallel, or in some embodiments, some specialized IRs are created prior to others and used as context passed into LLM agents responsible for generating the subsequent IR. For example, IRs associated with identifying major logical components and data structures may be created first and passed into, or made available with RAG implementations, an LLM agent responsible for distilling information about the logical flow or data flow of the pierce of source code.

IRs at Different Levels of Abstraction and Summarization

In some embodiments, IR content created for a single node (e.g., in a hierarchical tree of IRs, with parent nodes summarizing child nodes) may include elements targeting different levels of abstraction or summarization, regardless of the target information content. For example, in some embodiments IRs for a particular type of information are generated at the level of a single sentence, a single paragraph, or numerous paragraphs. IRs that are redundant but at different levels of abstraction or summarization can be very useful for later-stage LLM agent systems using RAG to solve more complex tasks and/or (use of the term "and/or" should not be read to imply use of the term "or" elsewhere requires xor, i.e., is an exclusive or) solve tasks that require moving up and down conceptual levels of abstraction/detail to generate quality output.

Chunking Source Content

In some embodiments, content such as the source code associated with a file cannot fit into the context window or prompt of an LLM agent such that chunking and aggregation steps are employed. In some embodiments, content such as source code or aggregated previously generated IRs (e.g., in the case of content associated with a folder) may be broken into overlapping chunks where the overlap fraction is a configurable parameter. In some embodiments chunks are non-overlapping chunks. In some embodiments, choice of chunk size, overlap length, and location is systematic and based on rigorous token counting and identifying suitable whitespace locations in the source code that does not cut between contiguous logic, such as a function definition. In other embodiments, choice of chunk size, length, and location is approximate or more arbitrary. Examples of chunking strategies include topic segmentation, query-based chunking, semantic chunking, size-based chunking, and dynamic chunking, which may be used in combination or independently, or other chunking strategies may be used. Some embodiments may leverage a source code interpreter or compiler to inform demarcation of chunks. For instance, some embodiments may input the source code into an interpreter or compiler and traverse an abstract syntax tree generated by the interpreter or complier in order to define chunks of corresponding source code based upon corresponding divisions between nodes of that abstract syntax tree generated by the interpreter or compiler. In some cases, an abstract syntax tree may be used to inform chunking used to generate a tree of intermediate representations. In some cases, chunking may be determined, in order of control, from first to last, by directory, by file, by module, and then by abstract syntax tree generated by the interpreter or compiler, e.g., applying recursive chunking to the resulting sub-divisions up through this hierarchy.

Chunk Aggregation

In some embodiments, specialized IRs as previously described are created for each chunk of source content when chunking is required or desired. In some cases, different chunking strategies may be used for different specialized IRs. In some embodiments, the content for the chunks is further aggregated by an LLM agent system into a single IR description for the source unit. A source unit could be a file or folder associated with a DAG node, an entire code base (aggregating for top-level or code base-wide content generation), or a collection of code bases.

Summarization and Compression

In some embodiments, arbitrary levels of content length can be handled by summarization and compression iterations. In these loops content that is too large to fit into an LLM agent's context window is first chunked as described in the previous sections. A summarized or compressed version of the chunked content is then produced by an LLM agent. In some embodiments, the chunk summaries can be simply aggregated or combined serially together and processed with further chunk and summarization cycles until the content length required is achieved. In other embodiments, more advanced iterative techniques such as chain-of-density and multi-pass agents may be used to control various aspects of summarization and compression.

Summarization and compression may be required at any part of the IR generation stack. For example, a file containing source code may be too large and require chunking, aggregation, and compression. In some embodiments, IR associated with folders in the code base is constructed by aggregating previously generated IRs associated with the child nodes of the folder (files or subfolders). In some embodiments, this aggregation may entail serially combining IR content for child nodes. Content aggregated in this manner may be too large to fit into the context window of an LLM and require chunking and summarization. In some embodiments, code base-wide content is similarly constructed by aggregating IRs for all nodes of the code base. In some embodiments, this same pattern is generally applied for every level of abstraction encountered in comprehension: individual nodes (files and folders), content and IR generated for the code base as a whole, and content and IR generated for many code bases associated together in a workspace or application landscape.

In some embodiments, logical structure may be inserted even when aggregated content is simply combined serially. For example, chunk descriptions are kept in the same order as the original chunks, code base-wide aggregations may be ordered in forward or reverse topological order (with respect to the DAG associated with the original file structure of the code base or a DAG constructed independent of the original file structure), the absolute or relative paths of nodes may be included when aggregating all nodes for code base-wide content, or elements of an abstract syntax tree (AST) provided by parser or compiler technologies may be included, etc.

IRs from a Top-Down Approach

In some embodiments, a "top down" approach is used to generate some IRs. In this approach, content is processed at or near the largest chunk sizes possible for a target model. For example, the source code of files is provided to an LLM agent in its entirety if it fits within the context window of the LLM or is chunked into chunks that are large relative to the LLM agent's context window size. Chunk aggregation, summarization, and compression strategies as previously described are then leveraged as needed.

The top-down approach is expected to maximize local contiguous context for LLM agents to generate content and minimizes the number of independent LLM agent calls required to produce IR content. In this top-down approach, a large contiguous context may be provided to an LLM query but the task may only concern a small portion of the context, such as building structured IR content that describes a single symbol in a larger file (such as a variable, a data structure, or a function/method). In other embodiments, only the bounds of the symbol will be provided to the LLM, and other elements of code in the file will not be provided.

IRs from a Bottom-Up Approach

In some embodiments a "bottom up" approach is used to generate more granular IR content as well as higher-node-level content. In this approach, the fundamental symbols in source code are identified, extracted, and have IR content generated. Relevant fundamental symbols and granular units generally depend on the syntax and semantics of a particular programming language (or similar such as a data exchange format) at hand and may include elements such as global variables, functions, subroutines, classes, methods, and data structures.

In some embodiments, granular units and symbols may be identified with non-LLM tools such as the universal ctags program or compiler technologies (parsers, AST generators, parser generators) associated with the specific programming language automatically identified and dispatched to.

In some embodiments, LLM agents are used to generically identify all of the granular units in a piece of source code, wherein the LLM agent is capable of identifying the programming language and/or symbols/granular units germane to the programming language context at hand.

The bottom-up approach, in some embodiments, provides the lowest level IR content meaningful in a code context and maximizes the granularity of the content available for operations such as semantic search and RAG.

In some embodiments, a processing template or pipeline builds a symbol table, AST, or the like for a part of the codebase. A data structure holding this structured representation of this of the constituent symbols of a source code part can be traversed, for example, after being scoped through search or filtering, and for each symbol in a traversal, IR content can be produced via one or more calls to an LLM. A prompt may be prepared for the LLM calls that includes relevant parts of the part of the codebase (such as the contiguous source code text delimiting the symbol, surrounding code, or other symbols related through a call structure analysis). In some embodiments, the prompt is further prepared by describing a strict structure or schema for the LLM to follow in structuring output. This strict structure or schema may be specific to the kind of symbol (such as a function describing inputs, outputs, and control and logical flow each in separate components of a JSON-compatible structure) under consideration and, in some embodiments, further specific to the particular language context of the symbol (e.g., programming language, data exchange format, etc.).

In some embodiments these are the most terminal branches of a large processing flow that starts with decomposing an entire codebase or a collection of codebases. Processing that includes the lowest level granular IRs described herein have, in some embodiments, several properties affording dramatically improved content quality generation in the general case. First, each individual LLM call may be greatly constrained-concerned with analyzing a particular symbol. Such a structured processing in some embodiments eliminates or reduces ambiguity, decision-making, and complexity that lead to poor LLM performance such as hallucinations or irrelevance of content. Such a structured processing also, in some embodiments, affords rigorously consistent output formatting and structure at the lowest level of content generation that can be applied consistently across arbitrarily sized and shaped codebases. This approach, in some embodiments, can be applied automatically and exhaustively equally as easily to a codebase of 10,000 lines of code and to one of 10 million lines of code or more. On the one hand, some embodiments have a mechanism to achieve consistent, high quality low level technical documentation, and on the other hand, through the process of repeated decomposition and application of these highly constrained processing steps, some embodiments can exhaustively process a codebase of arbitrary size and shape and maintain consistency and rigor. In some embodiments, the total number of individual LLM calls may exceed 10 thousand individual calls, 1 million individual calls, or 10 million individual calls. The number of calls may scale in some relationship to the size and complexity of the codebase (e.g., total source text bytes, lines of code, or symbol count). Furthermore, these foundational low-level IRs, in some embodiments, can be aggregated and built on top of arbitrarily for higher level IR content generation.

In some embodiments, components of a symbol table or the like constructed as described are revisited in one or more secondary passes, wherein LLM calls are used to iteratively update or refine IR descriptions of the symbols. In some embodiments, this includes providing as context previously generated IRs for the symbol at hand and/or associated symbols wherein association may be made through following an AST or call graph data structure (e.g., where a function has been called elsewhere in the codebase or what other functions it calls internally) or made by other means such as association by an analysis with LLMs.

Code Base-Wide IRs

In some embodiments independent IRs are generated associated with the code base or resource as a whole. IRs at this level can be helpful for user-facing content generation that describe a codebase or collection of codebases at higher levels, for specific audience types, or that focus on particular concepts. In some embodiments, code base-wide IRs include direct technical summaries from aggregation of node IRs. In some embodiments, code base-wide IRs focus on expressing the code base in specific terms or with a specific voice. For example, code base-wide IRs may include system architecture descriptions, system diagrams, product briefs, user persona definitions, user stories, user journeys, documentation of dependencies, identification of business logic at a higher level, documentation of capabilities in non-technical terms and without direct reference to any node content (files, folders, or their inner contents), business-oriented executive summaries, etc.

In some embodiments, high level content is produced through processing templates that iteratively traverse or otherwise consider previously generated and lower-level IR content. In some embodiments, this includes exhaustively visiting every component (such as DAG nodes and all of their associated IRs) of the codebase, for example, after pre-filtering based on categorizations or labels applied to content. This is expected to be helpful for "exhaustive" kinds of problems/queries/content generation such as describing the overall architecture of a codebase or rigorously including all components of a specific kind (such as API endpoints) in a global list or description. In some embodiments, RAG and semantic search methods may be used to isolate only relevant subsets of IRs and/or source materials. This is expected to be helpful, in some cases, for "needle-in-a-haystack" kinds of problems/queries/content generation such as describing how to modify the business logic located in a particular file or describing the implementation of a concept that is found locally only in one place or a small subset of the codebase. In some embodiments, both of these methods are used in the processing template that creates the total high-level document or other form of content.

In some embodiments, largely or entirely pre-defined processing templates are followed and executed iteratively to build a high-level document as described previously. In some embodiments, LLMs may be used to construct this structure on the fly based on analysis of scope or context provided in an initialization step, such as the particular codebase or codebases, other non-code assets, or sub-components thereof (e.g., particular subset scope of a large codebase). In some embodiments an outline is produced in a first step through the use of LLM calls and may be iteratively refined. In some embodiments this outline consists of just headers and section headers that define a whole document. In a next step, prompts for content generation local to a specific part of the outline may be constructed. In some embodiments, this is accomplished by iterating through sections and subsections of the outline and generating 1 or more LLM prompts, via LLM calls, for each subsection or section in the outline. In some embodiments, these two steps may be accomplished in one engagement with an LLM (e.g., a call or reasoning step). In a final step, the prompts now associated with specific locations and content of the outline are iterated through serially, in parallel, or some combination of these to generate the content to be placed at the corresponding location of the outline. In this manner, sin some embodiments, an arbitrarily large, structured, and sophisticated document can be built up automatically (e.g., without human intervention after initiating the process) with the structured and iterative use of LLMs. This approach, in some embodiments, affords the construction of arbitrarily large and complex documents while surgically breaking down the content generation into well constrained and scoped building block components. In some embodiments, interactive user feedback at any step of this process may be allowed and provided, while in other embodiments, this is performed fully autonomously.

Secondary Passes

In some embodiments, explicit secondary passes of LLM content generation follow immediately from an initial pass. In some embodiments these secondary passes depend on and make use of IRs created in earlier passes.

Aggregation of IR Content for Higher Level IR Content

In some embodiments, IR content is created for various level of abstractions beyond individual files of a code base. For example, content for folders is generated by aggregating content generated for child file nodes (files and subfolders).

In some embodiments, IR content associated with a code base as a whole is generated and based on aggregating IR content for all nodes in the code base. To generate these IRs, information distillation, summarization, and compression are important. For example, content for one or more of the parallel IR content sets produced at more granular levels (e.g., those discrete types of information described in Parallel IR Content Creation and Separating Signals) may be aggregated, summarized, and compressed in terms of the entire code base.

In some embodiments, IR content for each node is integrated directly and with equal weight in aggregation. For example, a one-page summary of every node is provided serially in topological or reverse topological order. In other embodiments, nodes may not be weighted equally. For example, only content from key summarization points such as subfolders may be included, while IR content directly associated with child nodes may be omitted. In another example, content from all nodes may be prepared but with different forms such as long descriptions for files but relatively short descriptions (single sentence or single paragraph) for folders.

In some embodiments, auxiliary information such as the file hierarchy with path names is provided explicitly in the aggregated content in addition to IR content describing nodes.

Using Multi-Pass Agents for Low-Latency Content Generation and Higher-Level IR Content In some embodiments, the output of the transpiler is collected and made available to downstream activities such as high-level content generation distinct from that produced automatically by the action of the transpiler. In some embodiments, this includes RAG pipelines and agents configured to power low-latency interactive content generation in a real-time setting with a user. While the activity of the transpiler may be to perform a significant amount of up front computation and content generation where time to process is not a significant constraint, real-time interactivity often sets hard latency constraints. For example, users may require output in seconds or minutes at most. In this context, the output of the transpiler can be seen as a helpful pre-computation step. Elements of the content and IRs produced by the transpiler can be tailored in this way to pre-compute common, typical, or broadly useful IRs to short-circuit and otherwise improve latency and quality for downstream low-latency interactive content generation by users. In some embodiments, a RAG pipeline (consisting of components such as semantic search, tools available for calling by an LLM, and pre-defined templates or pipelines) is built to exploit the existence of transpiler output for assets such as codebase brought into scope in an interactive user session.

Building Semantically Searchable Vector Databases with IR Content

This disclosure contemplates use of LLM agent systems to generate IR content and user-facing content built on top of IRs. In some embodiments, an application of some of the technologies described in this disclosure may be used with RAG and related techniques. In some embodiments these assets may be private, proprietary, or otherwise excluded from training data for the LLM models in use such that RAG or alternatives are required. In other embodiments, these assets may have been available at train time (e.g., open-source assets), but the ability to focus, constrain, and direct outputs is expected to be helpful.

To power RAG or any other technique wherein context is provided at runtime (or API call time), salient context must be available, searchable, and identifiable. In some embodiments, this is provided via vector databases or similar technologies where content is associated with an embedding, hash, or more generally a structure that carries semantic meaning and a means of comparing structures for similarity to a target. In some embodiments, embedding vectors are produced with one or more embedding models.

In some embodiments, one or more vector databases may be constructed for a target level of documentation. A target level may be a submodule or folder of a code base, the entire code base, or a collection of code bases and non-code resources that comprise a workspace.

In some embodiments, all IR content created for the target level of documentation is indexed into a single vector database. This may include all LLM-generated IR content (such as summaries, descriptions targeting specific information, etc.) as well as chunked source code. vectors may correspond to locations in an embedding space, for example, learned with metric learning, in which proximity corresponds to similarity in semantic value.

In some embodiments, IR content may be pre-separated based on one or more of various categorizations and added to distinct vector databases. For example, a vector database may be constructed housing source code elements only, summaries at a particular level of detail (single sentence, single paragraph, or single page), summaries at a particular level of abstraction (files, folders, submodules, or code base-wide), technical content describing external dependencies, non-technical IRs describing capabilities, user stories, or product requirements, etc. Pre-separation is expected to allow for orthogonalizing certain types of information ahead of time that can be flexibly mixed together in downstream applications or be given as separate tools to LLM agent systems configured to interface with tools.

In some embodiments, one IR may be used to index content into a vector database such that many IRs are associated with the IR used to construct the index. For example, short paragraph descriptions of nodes may be used to populate a vector database. At query time in the application, in some embodiments, when a particular embedding is identified as semantically associated or meaningful, all other IR content conceptually associated with the node (e.g., longer descriptions, technical detailed descriptions, non-technical descriptions, specialized topic descriptions, etc.) are fetched together with the associated short paragraph IR.

An aspect of this disclosure is the generation of large amounts of IRs that are used to construct vector databases and power semantic search in RAG (e.g., to respond to prompts regarding the underlying code base) in a manner expected to be significantly more capable, useful, and powerful than the case where chunked source code or auxiliary data alone are used. The generation of IRs that carry human-language and descriptive information of software assets at different levels of abstraction can greatly improve semantic search and recall capabilities for LLM agents. None of this is to suggest that systems that do not use retrieval augmented generation are disclaimed or that any other feature elsewhere is disclaimed or required.

Constructing IR Distinct from the DAG

In some embodiments, content at a higher level of abstraction need not be associated with the DAG nodes. Instead, LLM agent systems are tasked with identifying major categories associated with the code base. These categories may be discrete capabilities, functionalities, etc. from a purely technical point of view, from a product or business functionality point of view, or any other method of categorizing information about a code base. In some embodiments, content is created for each such category.

Multi-Pass and Iterative Agents

In some embodiments, multi-pass LLM agent systems may be used to generate higher-level IR content in an iterative fashion as described in Closed Loop IR Generation and Agent Systems. Multi-pass agent systems are expected to be able to build longer form IRs, IRs that require combining information from distinct places and from different levels of abstraction, and IRs that require discrete serial steps to form.

In some embodiments multiple agents communicate with each other in an iterative process to generate a higher-level IR. For example, agents with different personas can be tasked with evaluating the output of other agents with different personas and critiquing, adding to, or modifying their output. Personas can focus on technical roles, non-technical roles, critiquing roles, copy-editing roles. In some embodiments, explicit iteration parameters or criteria evaluated external of LLM agents are used to terminate agent generative loops. In some embodiments, critic agents may be used to terminate agent generative loops.

In some embodiments, semantically searchable vector databases as described in Building semantically searchable vector databases with IR content are used to power multi-pass iterative agents. Content may be extracted through semantic similarity searches automatically for these agent systems or may be provided to LLM agents as a tool to be used at the agent's operational discretion.

Comprehension Strategies

This disclosure contemplates, in some embodiments, the creation of many IRs for different purposes and at different levels of abstraction as previously described. Some embodiments implement strategies to generate these different IRs, which include more direct "open-loop" methods and more complex "closed-loop" methods.

Open Loop and Single Shot IR Generation

In some embodiments, open-loop methods are used to generate IRs. By loose analogy to control theory, by open-loop this disclosure means some content is created in a single pass by giving an LLM agent a static piece of content/context. There is no feedback or secondary steps after an initial IR content generations step.

In some embodiments, this open loop IR generation step is used to build a base/foundational IR platform on top of which later passes of generation can benefit. In some embodiments, a DAG constructed from the file structure of a code base is used as the default skeleton to methodically produce initial IRs.

In some embodiments, base or "open loop" generation is defined by constructing a specific context passed into an LLM to generate output in one LLM instance invocation, wherein this output is the content of the IR.

In some embodiments, this context is a snippet of source code, an identifiable symbol of source code (a function definition and its body for example), an entire source code module, an entire source code file, or source code aggregated together from multiple files or modules.

In some embodiments, this context is an aggregated IRs from a previous IR generation. For example, paragraph descriptions of child files and sub-folders are aggregated together to generate output for the parent folder. As another example, descriptions of external dependencies for all child nodes of a folder, a code base as a whole, or a collection of code bases in a workspace may be aggregated together to generate output associated with the parent abstraction level.

In some embodiments, summarization and compression of arbitrary amounts of content is accomplished by iteration or loops comprised of repeated single-shot or open-loop generation where significant amounts of content are provided as input context and the LLM produces a reduced amount of summarized or compressed content.

In some embodiments, these open loop or single shot methods are used to generate early-phase IR content that is expected to be efficient, low-cost, well-scoped, and highly constrained by the lack of non-deterministic loops and deterministic/methodical choice of input context.

Figure 6:
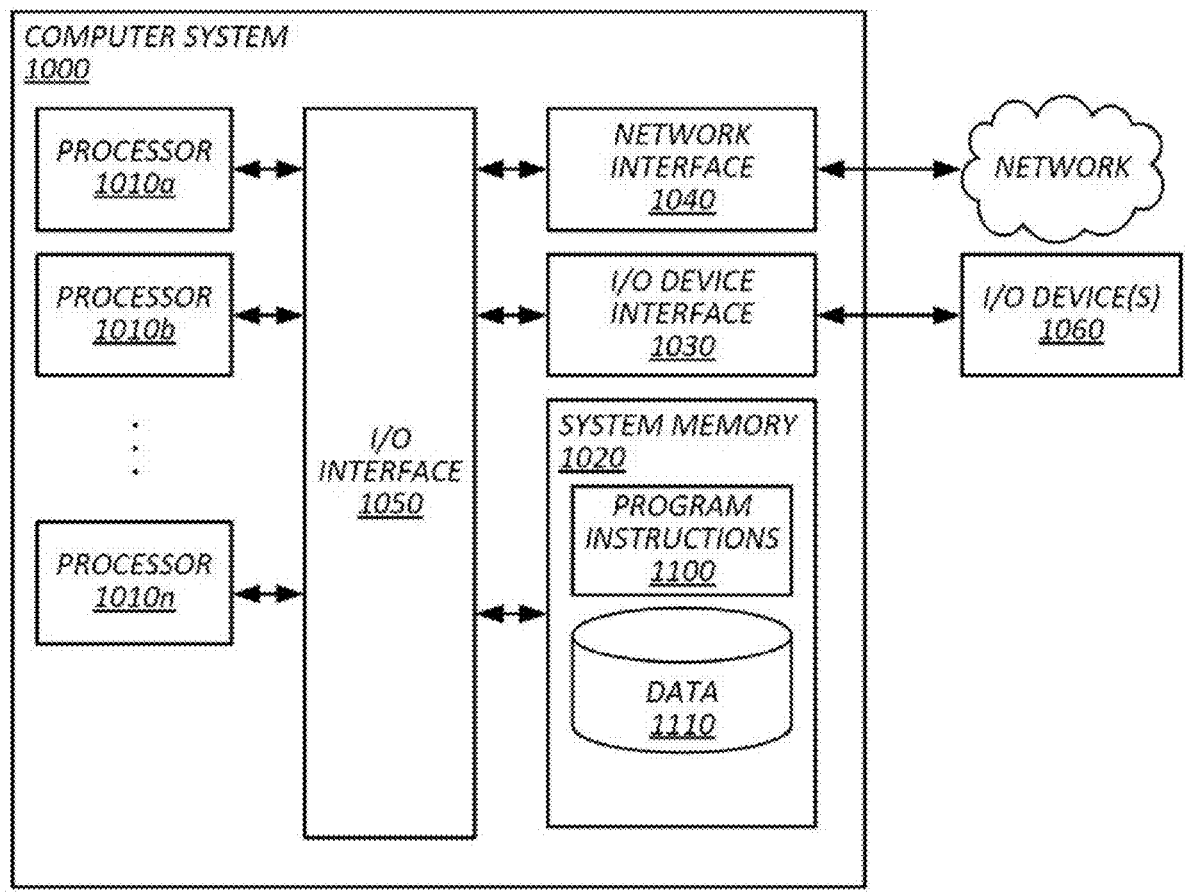
FIG. 6 illustrates an example of a computing device by which the computing systems and processes described herein may be implemented.

In some cases, the techniques described herein may be implemented on one or more of the computer systems described below with reference to FIG. 6. In some embodiments, a computer system may include multiple instances of such devices, for example, communicating with one another over the Internet or various other networks. In some embodiments, such a computing environment may include a user computing device by which a user makes requests for summaries, analysis, guidance, tutorials, and the like regarding a code base based upon the IRs discussed above. In some cases, the computing environment may include a source code repository, for example, with one or more code bases, in some cases, stored in a version control system. In some embodiments, a cloud-hosted code base analysis system may have access to that source code repository and may perform the operations described herein to produce user interfaces on the user computing device based upon code bases in the source code repository. In some embodiments, the code base analysis system may be integrated with an integrated development environment executing on the user computing device, DevOps tooling, user-facing technical documentation, tools for instrumenting the code base for various forms of metrology, tools for analyzing the code base with verifiable computing techniques, issue tracking systems, code testing systems, and the like.

In some embodiments, a transformer architecture-based LLM may be used. The method for processing text data may involve multiple steps. Initially, text data may be tokenized using methods such as subword tokenization, including Byte Pair Encoding (BPE). Subsequently, the system may construct separate encoder and decoder layers, each consisting of components like multi-headed self-attention and feed-forward neural networks. Encoder only, decoder only, or encoder-decoder LLMs may be used. Some embodiments may implement a multi-headed attention mechanism using scaled dot-product attention. This, in some embodiments, involves linear transformations and partitioning of queries, keys, and values across multiple heads. Positional encoding is another feature that may be integrated to maintain the sequence order due to the absence of recurrence in the transformer model. During the training phase, the system may utilize loss functions, such as cross-entropy. Optimization algorithms, such as Adam, may be employed, alongside techniques like learning rate scheduling. For inference tasks, various sampling strategies, such as greedy, beam search, or top-k sampling may be implemented. The temperature parameter in softmax functions might be adjusted to influence the randomness in the model's predictions. Regularization techniques, including dropout and layer normalization, may be applied to enhance model performance and stability. Furthermore, developers might incorporate additional features like custom tokenization schemes, alternative attention mechanisms (e.g., sliding window attention, grouped query attention, cross-attention, or the like), or different model architectures to suit specific requirements. In some cases, the transformer architecture implements a large language model having more than 4 billion parameters, 8 billion parameters, 13 billion parameters, 30 billion parameters, or 75 billion parameters. In some cases, a collection of such large language models may be combined in a mixture-of-experts architecture with a router that routes different prompts or portions of prompts to different ones of the large language models. In some cases, these large language models may be integrated with agents that execute a series of steps in pursuit of a goal. In some embodiments, the large language models may be fine-tuned with various approaches such as reinforcement learning with human feedback.

FIG. 5 is a diagram that illustrates an exemplary computing system 1000 in accordance with embodiments of the present technique. A single computing device is shown, but some embodiments of a computer system may include multiple computing devices that communicate over a network, for instance in the course of collectively executing various parts of a distributed application. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following first group of enumerated embodiments:

1. A method, comprising: obtaining, with a computer system, access to a code base; decomposing, with the computer system, the code base into parts; classifying, with the computer system, the parts according to content type; selecting, with the computer system, processing templates based on the content types, with at least some different content types having different selected processing templates; and generating natural language documentation for the parts, with one or more generative language models, using the processing templates selected for the parts.

2. The method of embodiment 1, wherein decomposing comprises: constructing a directed acyclic graph (DAG) corresponding to folders and files of the code base, nodes of the DAG being some of the parts; and for at least some leaf nodes of the DAG corresponding to files in a structured language, decomposing the respective files with a parser to form a full or complete abstract syntax tree (AST), full or complete parse tree, or symbol table, nodes of the AST or parse tree or symbols of the symbol table also being some of the parts.

3. The method of embodiment 2, wherein classifying comprises: classifying the parts that are nodes of the DAG according to classifications applied to parts of the leaf nodes contained in folders or files that are children nodes of respective nodes of the DAG; and classifying the parts that are nodes of the AST or symbols of the symbol table according to classifications determined by the parser.

4. The method of any one of embodiments 1-3, wherein the processing templates comprise means for specifying processing of a part to form at least part of the documentation.

5. The method of any one of embodiments 1-4, wherein: less than 10% of the parts are expressly included in a context window of the language models when generating the natural language documentation; at least some files in the code base contain different parts that are classified as different content types; the code base comprises source code having more than one-million lines of code in text files distributed within a hierarchical directory; decomposing the code base into parts comprises decomposing the source code, at least in part, based on boundaries of functions expressed in the source code; decomposing the code base into parts comprises decomposing the source code, at least in part, based on which text file and directory includes the respective source code; the code base comprises source code, configuration data, and metadata and classifying based on content type includes classifying the following into different categories from one another: source code, configuration data, and metadata; the different selected processing templates comprise different language-model prompts; the natural language documentation is a manual for the code base, the manual describing functionality implemented by the code base as a whole, functionality implemented by subsets of the parts with a plurality of parts, and functionality implemented at least some of the parts individually; at least some of the parts are processed concurrently on different processors; the natural language documentation contains at least 5,000 words in a monolithic body of text and is distinct from comments in the source code; the description of functionality implemented by the code base as a whole is generated with the language models based on the descriptions of functionality implemented by subsets of the parts with a plurality of parts and functionality implemented the at least some of the parts individually; and the generative language model comprises a transformer with multi-headed attention.

6. The method of any one of embodiments 1-5, wherein: the processing templates include instructions to generate diagrams, including architecture diagrams and data flow diagrams, based on the decomposed parts of the code base; generating the natural language documentation comprises iteratively refining intermediate representations to produce higher-level abstractions of the documentation relative to abstractions of the documentation prior to refining; classification of content types is based, at least in part, on metadata extracted from the code base, including file types, versioning information, or dependency relationships; and the generative language models are configured to generate multilingual documentation by providing natural language outputs in at least two different human languages.

7. The method of any one of embodiments 1-6, wherein: generating natural language documentation includes generating descriptions at multiple levels of granularity, including technical documentation for individual functions, entire files, and the code base as a whole.

8. The method of any one of embodiments 1-7, wherein: the processing templates include constraints on output length, terminology consistency, and level of detail, based on predefined documentation standards or user preferences.

9. The method of any one of embodiments 1-8, wherein: the natural language documentation comprises at least four of the following: technical documentation, architecture descriptions, getting started guides, user guides, product briefs, application landscape summaries, block diagrams, audio summaries, video summaries, tutorials, application notes, code base summaries, dependency graphs, compliance documentation, security analysis reports, memory safety reports, performance analysis reports, testing documentation, application-program interface descriptions, internal documentation, system architecture diagrams, executive summaries, user persona definitions, user stories, and user journeys.

10. The method of any one of embodiments 1-9, wherein: the generative language models are enhanced with retrieval-augmented generation (RAG) to incorporate external documentation or domain-specific knowledge into the natural language outputs.

11. The method of any one of embodiments 1-10, wherein: the decomposition step includes parsing abstract syntax trees (ASTs) or other hierarchical structures to determine the logical boundaries of the code base.

12. The method of any one of embodiments 1-11, wherein: at least some of the selected processing templates specify different static analysis tools from one another.

13. The method of any one of embodiments 1-12, comprising, after the code base is updated, generating updated documentation by: obtaining a diff between a previous version and an updated version of the code base; determining which portions of hierarchical tree of intermediate representations are affected by the diff; and updating the portions of hierarchical tree of intermediate representations determined to be affected by the diff, at least some portions being based on other portions; and generated updated natural language documentation based on the updated portions of the hierarchical tree of intermediate representations.

14. The method of any one of embodiments 1-13, wherein: the classification of content types includes identifying parts implementing user-facing application program interfaces, backend services, and internal libraries, wherein different processing templates are applied to each classification.

15. The method of any one of embodiments 1-14, further comprising: hosting the code base and providing a version control system; providing an integrated development environment in which the code base is, at least partially, developed; or autocompleting source code in the code base during development of the code base.

16. The method of any one of embodiments 1-15, wherein generating the natural language documentation comprises performing multi-pass processing of intermediate representations, the multi-pass processing including: generating initial intermediate representations for respective parts of the code base, producing an initial intermediate representation at a first level of granularity; refining the initial intermediate representations through successive processing passes with the language models, each pass incorporating additional contextual information, such as interdependencies between parts or hierarchical relationships within the code base; synthesizing the refined intermediate representations into higher-level abstractions relative to abstractions prior to synthesizing, including aggregated summaries for subsets of the code base and the code base as a whole; and using the higher-level abstractions to produce the natural language documentation.

17. The method of any one of embodiments 1-16, wherein generating the natural language documentation comprises fanning out concurrent processing for different prompts for the same task within a selected processing template, the concurrent processing including: generating multiple versions of documentation for a given part of the code base using different prompts or configurations, each version targeting a different output style, level of detail, or emphasis; evaluating the generated versions using one or more criteria, including at least one of coherence, relevance, and alignment with predefined documentation standards; and selecting a subset of the versions for the given part of the code base based on the evaluation criteria.

18. A tangible, non-transitory, machine-readable medium storing instructions that, when executed, effectuate the operations of any one of embodiments 1-17.

19. A computer system, comprising: one or more processors and memory storing instructions that when executed by the one or more processors effectuate the operations of any one of embodiments 1-17.

The present techniques will be better understood with the following second group of enumerated embodiments:

1. A method, comprising: obtaining, with a computer system, access to a code base; decomposing, with the computer system, the code base into parts; generating, with the computer system, documentation for the parts with a language model; associating, with the computer system, the documentation with the parts; indexing, with the computer system, the documentation; obtaining, with the computer system, a query searching for content in the code base; searching, with the computer system, using the index, the code base based on the generated documentation to identify documentation corresponding to the query and, then, content in the code base associated with the identified documentation; and responding, with the computer system, to the query, by identifying the content in the code base associated with the identified documentation.

2. The method of embodiment 1, wherein: the code base comprises more than 1 million lines of source code; decomposing comprises decomposing the code base into more than 100 parts; generating documentation comprises generating natural language documentation in which portions documenting different ones of the parts of the code base are delimited or otherwise separated; associating the documentation with the parts comprises associating each portion with the different ones of the parts of the code base that the respective portion documents; indexing comprises computing embedding vectors in an embedding space for each of the portions; the embedding space has more than 100 dimensions; the query is natural language text; and searching comprises: computing a query embedding vector based on the natural language text of the query, computing distances in the embedding space between the query embedding vector and at least some of the embedding vectors for the portions, selecting a subset of the portions with shorter distances that other, unselected portions, and determining which parts of the code base are associated with the selected subset of the portions of the documentation.

3. The method of embodiment 1, wherein: the documentation is intermediate representations in natural language text; and the intermediate representations are formed in a hierarchy, with some intermediate representations at higher levels of the hierarchy characterizing subsets of intermediate representations at lower levels of the hierarchy.

4. The method of embodiment 3, wherein the intermediate representations at higher levels of the hierarchy are associated with more parts of the code base than the intermediate representations at lower levels of the hierarchy.

5. The method of embodiment 3, wherein the intermediate representations are used for semantic search of the code base.

6. The method of any one of embodiments 1-5, wherein a plurality of different types of documentation are generated for at least some of the parts.

7. The method of any one of embodiments 1-6, wherein: indexing comprises computing embedding vectors for different portions of the documentation.

8. The method of embodiment 7, wherein the vectors are within a manifold in which proximity corresponds to similarity between items being embedded.

9. The method of embodiment 7, wherein: searching comprises selecting subsets of the portions based on proximity in a latent space to an embedding vector based on the query.

10. The method of embodiment 9, wherein searching comprises an approximate nearest neighbor search in a multidimensional embedding space, the approximate nearest neighbor search comprising: constructing a graph structure in the multidimensional embedding space, the graph structure including: nodes representing embedding vectors in the embedding space; and directed edges between the nodes, the edges being defined based on proximity of vectors in the embedding space, wherein each node is connected to a subset of other nodes identified as neighbors according to a distance metric; organizing the graph structure into multiple hierarchical layers, each layer comprising: a subset of the nodes; and a respective density of nodes, wherein higher layers have fewer nodes and represent a coarser resolution of the embedding space than lower layers; initiating the approximate nearest neighbor search from an entry point in a highest layer of the graph structure, the entry point being a node selected based on its representation at the respective hierarchical layer; performing a traversal of the graph structure, comprising: iteratively moving from a current node to one or more neighboring nodes in the same layer, the movement being based on reducing the distance metric between a query embedding vector and the neighboring nodes; and terminating the traversal at a node where no neighboring node in the same layer has a shorter distance to the query embedding vector than the current node; transitioning to a lower layer of the graph structure upon termination of the traversal at a given layer, and repeating the traversal at the lower layer using the node in the lower layer corresponding to or nearest to the terminating node of a higher layer; and returning a set of candidate nodes from the traversal at the lowest layer, the candidate nodes being identified as approximate nearest neighbors to the query embedding vector based on the distance metric.

11. The method of any one of embodiments 1-10, wherein responding comprises causing a code editor of a user to navigate to the content in the code base associated with the identified documentation.

12. The method of any one of embodiments 1-11, wherein obtaining the query comprises reformulating the query with a language model before searching.

13. The method of any one of embodiments 1-12, comprising generating content with a language model based on the content in the code base associated with the identified documentation, wherein searching includes using a hybrid search that combines semantic search with keyword-based matching.

14. The method of any one of embodiments 1-13, wherein: the documentation is updated dynamically responsive to on changes in the code base, and the updated documentation is re-indexed for consistency with a latest version of the code base in response to the updated documentation.

15. The method of any one of embodiments 1-14, wherein: decomposing the code base into parts includes using static analysis tools to generate an abstract syntax tree, and the generated documentation includes descriptions of the abstract syntax tree's nodes and edges.

16. The method of any one of embodiments 1-15, wherein: searching comprises ranking the identified documentation and associated content in the code base based on relevance scores computed using a similarity metric between a query embedding vector and the embedding vectors of the documentation.

17. The method of any one of embodiments 1-16, comprising: generating source code based on results of the search; providing an independent development environment in which at least part of the code base is developed or maintained; or generating further documentation based on the results of the search.

18. The method of any one of embodiments 1-17, wherein decomposing comprises: constructing a directed acyclic graph (DAG) corresponding to folders and files of the code base, nodes of the DAG being some of the parts; and for at least some leaf nodes of the DAG corresponding to files in a structured language, decomposing the respective files with a parser to form a full or complete abstract syntax tree (AST), full or complete parse tree, or symbol table, nodes of the AST or parse tree or symbols of the symbol table also being some of the parts.

19. The method of embodiment 18, wherein classifying comprises: classifying the parts that are nodes of the DAG according to classifications applied to parts of the leaf nodes contained in folders or files that are children nodes of respective nodes of the DAG; and classifying the parts that are nodes of the AST or symbols of the symbol table according to classifications determined by the parser.

20. A tangible, non-transitory, machine-readable medium storing instructions that, when executed, effectuate the operations of any one of embodiments 1-19.

21. A computer system, comprising: one or more processors and memory storing instructions that when executed by the one or more processors effectuate the operations of any one of embodiments 1-19.

What is claimed is:

1. A method, comprising:
   obtaining, with a computer system, access to a code base;
   decomposing, with the computer system, the code base into parts, wherein decomposing comprises:
      constructing a directed acyclic graph (DAG) corresponding to folders and files of the code base, nodes of the DAG being some of the parts; and
      for at least some leaf nodes of the DAG corresponding to files in a structured language among the files of the code base, decomposing the respective files with a parser to form a full or complete abstract syntax tree (AST), full or complete parse tree, or symbol table, nodes of the AST or parse tree or symbols of the symbol table also being some of the parts;
   classifying, with the computer system, the parts according to content type;
   selecting, with the computer system, processing templates based on the content types, with at least some different content types having different selected processing templates; and
   generating natural language documentation for the parts, with a plurality of generative language models, using the processing templates selected for the parts, wherein:
      at least some of the selected processing templates comprise a plurality of prompts in a chain of prompts and specify which of the plurality of prompts and which of the plurality of generative language models to use at each step in a sequence specified by the chain of prompts;
      at least some of the selected processing templates call other processing templates among those selected, and at least some of the processing templates specify how to aggregate of various intermediate generated outputs into a single structured output corresponding to a plurality of the parts; and
   generating the natural language documentation comprises:
      combining a prompt from one of the selected processing templates and a given one of the parts of the code base to form a model input; and
      causing a given one of the one or more generative language models to tokenize the model input into subword units, map resulting tokens to a first set of embeddings with a lookup table, augment the first set of embeddings with a second set of embeddings based on respective tokens' positions in a sequence of the model input, and processing resulting augmented tokens through a plurality of layers of the given one of the one or more generative language models wherein a plurality of different vectors are computed in each layer of the plurality of layers, and scores are computed based on scaled dot products between pairs of the plurality of different vectors.

2. A method, comprising:
   obtaining, with a computer system, access to a code base;
   decomposing, with the computer system, the code base into parts;
   classifying, with the computer system, the parts according to content type;
   selecting, with the computer system, processing templates based on the content types, with at least some different content types having different selected processing templates; and
   generating natural language documentation for the parts, with one or more generative language models, using the processing templates selected for the parts, wherein:
      at least some of the one or more generative language models comprise a transformer with multi-headed attention
      at least some of the selected processing templates comprise a plurality of prompts in a chain of prompts and specify which of the plurality of prompts and which of the plurality of generative language models to use at each step in a sequence specified by the chain of prompts;
      at least some of the selected processing templates call other processing templates among those selected, and at least some of the processing templates specify how to aggregate of various intermediate generated outputs into a single structured output corresponding to a plurality of the parts; and
   generating the natural language documentation comprises:
      combining a prompt from one of the selected processing templates and a given one of the parts of the code base to form a model input; and
      causing a given one of the one or more generative language models to tokenize the model input into subword units, map resulting tokens to a first set of embeddings with a lookup table, augment the first set of embeddings with a second set of embeddings based on respective tokens' positions in a sequence of the model input, and processing resulting augmented tokens through a plurality of layers of the given one of the one or more generative language models wherein a plurality of different vectors are computed in each layer of the plurality of layers, and scores are computed based on scaled dot products between pairs of the plurality of different vectors.

3. The method of claim 2, wherein decomposing comprises:
constructing a directed acyclic graph (DAG) corresponding to folders and files of the code base, nodes of the DAG being some of the parts; and
for at least some leaf nodes of the DAG corresponding to files in a structured language among the files of the code base, decomposing the respective files with a parser to form a full or complete abstract syntax tree (AST), full or complete parse tree, or symbol table, nodes of the AST or parse tree or symbols of the symbol table also being some of the parts.

4. The method of claim 3, wherein classifying comprises:
classifying the parts that are nodes of the DAG according to classifications applied to parts of the leaf nodes contained in at least some of the folders or files that are children nodes of respective nodes of the DAG; and
classifying the parts that are nodes of the AST or symbols of the symbol table according to classifications determined by the parser.

5. The method of claim 2, wherein the processing templates comprise means for specifying processing of a part to form at least part of the documentation.

6. The method of claim 2, wherein:
less than 10% of the parts are expressly included in a context window of the generative language models when generating the natural language documentation;
at least some files in the code base contain different parts that are classified as different content types;
the code base comprises source code having more than one-million lines of code in text files distributed within a hierarchical directory;
decomposing the code base into parts comprises decomposing the source code, at least in part, based on boundaries of functions expressed in the source code;
decomposing the code base into parts comprises decomposing the source code, at least in part, based on which text file and directory includes the respective source code;
the code base comprises source code, configuration data, and metadata and classifying based on content type includes classifying the following into different categories from one another: source code, configuration data, and metadata;
the natural language documentation is a manual for the code base, the manual describing functionality implemented by the code base as a whole, functionality implemented by subsets of the parts with a plurality of parts, and functionality implemented at least some of the parts individually;
at least some of the parts are processed concurrently on different processors;
the natural language documentation contains at least 5,000 words in a monolithic body of text and is distinct from comments in the source code; and
the description of functionality implemented by the code base as a whole is generated with the generative language models based on the descriptions of functionality implemented by subsets of the parts with a plurality of parts and functionality implemented the at least some of the parts individually.

7. The method of claim 2, wherein:
the processing templates include instructions to generate diagrams, including architecture diagrams and data flow diagrams, based on the decomposed parts of the code base;
generating the natural language documentation comprises iteratively refining intermediate representations to produce higher-level abstractions of the natural language documentation relative to abstractions of the natural language documentation prior to refining;
classification of content types is based, at least in part, on metadata extracted from the code base, including file types, versioning information, or dependency relationships; and
the generative language models are configured to generate multilingual documentation by providing natural language outputs in at least two different human languages.

8. The method of claim 2, wherein:
generating the natural language documentation includes generating descriptions at multiple levels of granularity, including technical documentation for individual functions, entire files, and the code base as a whole.

9. The method of claim 2, wherein:
the processing templates include constraints on output length, terminology consistency, and level of detail, based on predefined documentation standards or user preferences.

10. The method of claim 2, wherein:
the natural language documentation comprises at least four of the following: technical documentation, architecture descriptions, getting started guides, user guides, product briefs, application landscape summaries, block diagrams, audio summaries, video summaries, tutorials, application notes, code base summaries, dependency graphs, compliance documentation, security analysis reports, memory safety reports, performance analysis reports, testing documentation, application-program interface descriptions, internal documentation, system architecture diagrams, executive summaries, user persona definitions, user stories, and user journeys.

11. The method of claim 2, wherein:
the generative language models are enhanced with retrieval-augmented generation (RAG) to incorporate external documentation or domain-specific knowledge into natural language outputs.

12. The method of claim 2, wherein:
the decomposition step includes parsing abstract syntax trees (ASTs) or other hierarchical structures to determine logical boundaries of the code base.

13. The method of claim 2, wherein:
at least some of the selected processing templates specify different static analysis tools from one another.

14. The method of claim 2, comprising, after the code base is updated, generating updated documentation by:
obtaining a diff between a previous version and an updated version of the code base;
determining which portions of hierarchical tree of intermediate representations are affected by the diff;
updating the portions of the hierarchical tree of intermediate representations determined to be affected by the diff, at least some portions being based on other portions; and
generating updated natural language documentation based on the updated portions of the hierarchical tree of intermediate representations.

15. The method of claim 2, wherein:
the classification of content types includes identifying a plurality of parts implementing user-facing application program interfaces, backend services, and internal libraries, wherein different processing templates are applied to each classification.

16. The method of claim 2, further comprising:
hosting the code base and providing a version control system;
providing an integrated development environment in which the code base is, at least partially, developed; or
autocompleting source code in the code base during development of the code base.

17. The method of claim 2, wherein generating the natural language documentation comprises performing multi-pass processing of intermediate representations, the multi-pass processing including:
generating initial intermediate representations for respective parts of the code base, producing an initial intermediate representation at a first level of granularity;
refining the initial intermediate representations through successive processing passes with the generative language models, each pass incorporating additional contextual information, such as interdependencies between parts or hierarchical relationships within the code base;
synthesizing the refined intermediate representations into higher-level abstractions relative to abstractions prior to synthesizing, including aggregated summaries for subsets of the code base and the code base as a whole; and
using the higher-level abstractions to produce the natural language documentation.

18. The method of claim 2, wherein generating the natural language documentation comprises fanning out concurrent processing for the different prompts for the same task within a selected processing template, the concurrent processing including:
generating multiple versions of documentation for a given part of the code base using the different prompts or configurations, each version targeting a different output style, level of detail, or emphasis;
evaluating the generated versions using one or more criteria, including at least one of coherence, relevance, and alignment with predefined documentation standards; and
selecting a subset of the generated versions for the given part of the code base based on the evaluation criteria.

19. The method of claim 18, comprising:
combining a plurality of the generated versions among the subset to produce a synthesized output.

20. The method of claim 2, comprising:
steps for generating intermediate representations.

21. A tangible, non-transitory, machine-readable medium storing instructions that, when executed, effectuate operations comprising:
obtaining, with a computer system, access to a code base;
decomposing, with the computer system, the code base into parts;
classifying, with the computer system, the parts according to content type;
selecting, with the computer system, processing templates based on the content types, with at least some different content types having different selected processing templates,
wherein at least some of the processing templates comprise:
a static analysis tool,
a chain of language-model prompts, and
processing logic with branching logic that selects among prompts in the chain and causes multiple prompts in the chain to be applied; and
generating natural language documentation for the parts, with one or more generative language models, using the processing templates selected for the parts wherein:
at least some of the selected processing templates call other processing templates among those selected, and at least some of the processing templates specify how to aggregate of various intermediate generated outputs into a single structured output corresponding to a plurality of the parts; and
generating the natural language documentation comprises:
combining a prompt from one of the selected processing templates and a given one of the parts of the code base to form a model input; and
causing a given one of the one or more generative language models to tokenize the model input into subword units, map resulting tokens to a first set of embeddings with a lookup table, augment the first set of embeddings with a second set of embeddings based on respective tokens' positions in a sequence of the model input, and processing resulting augmented tokens through a plurality of layers of the given one of the one or more generative language models wherein a plurality of different vectors are computed in each layer of the plurality of layers, and scores are computed based on scaled dot products between pairs of the plurality of different vectors.

* * * * *